US012580943B2

(12) United States Patent
Cote et al.

(10) Patent No.: US 12,580,943 B2
(45) Date of Patent: Mar. 17, 2026

(54) SYSTEMS AND METHODS FOR NETWORK RESILIENCY

(71) Applicant: KBR Wyle Services, LLC, Houston, TX (US)

(72) Inventors: Ian Richard Cote, Chelmsford, MA (US); Hoai Xuan Vu, Westminster, CA (US)

(73) Assignee: KBR Wyle Services LLC, Houston, TX (US)

( * ) Notice: Subject to any disclaimer, the term of this patent is extended or adjusted under 35 U.S.C. 154(b) by 190 days.

(21) Appl. No.: 18/328,546

(22) Filed: Jun. 2, 2023

(65) Prior Publication Data

US 2023/0396642 A1      Dec. 7, 2023

Related U.S. Application Data

(60) Provisional application No. 63/348,925, filed on Jun. 3, 2022.

(51) Int. Cl.
*H04L 9/40*          (2022.01)

(52) U.S. Cl.
CPC ...... *H04L 63/1433* (2013.01); *H04L 63/1466* (2013.01)

(58) Field of Classification Search
CPC ........................ H04L 63/1433; H04L 63/1466
See application file for complete search history.

(56) References Cited

U.S. PATENT DOCUMENTS

| | | | |
|---|---|---|---|
| 9,788,213 | B1 | 10/2017 | Nicholas et al. |
| 10,601,932 | B2 | 3/2020 | Kodaypak et al. |
| 10,673,751 | B2 | 6/2020 | Dowlatkhah et al. |
| 10,764,789 | B2 | 9/2020 | Qiao et al. |

(Continued)

FOREIGN PATENT DOCUMENTS

WO          2021037175 A1      3/2021

OTHER PUBLICATIONS

Alderson et al. (Jan. 2011). "Solving Defender-Attacker-Defender Models for Infrastructure Defense," Naval Postgraduate School; 23 pages.

(Continued)

*Primary Examiner* — Stephen T Gundry
(74) *Attorney, Agent, or Firm* — Gary M. Machetta

(57)          ABSTRACT
A method comprising defining a model that represents a communication network, wherein defining the model comprises: formulating a directed graph comprising nodes that represent communication data sources, communication data sinks, and communication data routers of at least a portion of the communication network and arcs connecting nodes that represent communication links between the communication data sources, communication data sinks, and communication data routers, defining a plurality of layers, each layer associated with a different set of communication priorities and comprising a replication of the directed graph, and assigning data communication attributes to the nodes and arcs of each layer, at least a portion of the data communication attributes being associated with different communication priorities; and determining an optimized set of communication flows through the model based on a minimization of communication cost.

27 Claims, 30 Drawing Sheets

(56) References Cited

U.S. PATENT DOCUMENTS

| | | | | |
|---|---|---|---|---|
| 10,893,508 | B2 | 1/2021 | Chen et al. | |
| 11,122,439 | B2 | 9/2021 | Wang et al. | |
| 11,146,453 | B2 | 10/2021 | Li | |
| 11,153,813 | B2 | 10/2021 | Qiao et al. | |
| 12,032,681 | B1 * | 7/2024 | Donovan | G06F 21/552 |
| 12,130,878 | B1 * | 10/2024 | Nanduri | H04L 63/10 |
| 12,267,345 | B1 * | 4/2025 | Erlingsson | G06F 9/5072 |
| 12,309,188 | B1 * | 5/2025 | Al Ghazo | H04L 63/1425 |
| 2009/0190494 | A1 * | 7/2009 | De Giovanni | H04L 47/32 |
| | | | | 370/254 |
| 2014/0258356 | A1 | 9/2014 | Zeng et al. | |
| 2016/0335223 | A1 | 11/2016 | Zeng et al. | |
| 2019/0258953 | A1 | 8/2019 | Lang et al. | |
| 2021/0226838 | A1 | 7/2021 | Hegarty et al. | |
| 2021/0282072 | A1 | 9/2021 | Xin et al. | |
| 2021/0344437 | A1 | 11/2021 | Baracca et al. | |
| 2022/0368625 | A1 * | 11/2022 | Smith | H04L 45/24 |
| 2023/0254335 | A1 * | 8/2023 | Tan | G06F 16/2455 |
| | | | | 726/25 |
| 2023/0261983 | A1 * | 8/2023 | Basu | H04L 45/38 |
| | | | | 370/351 |
| 2023/0300032 | A1 * | 9/2023 | Noel | H04L 41/12 |
| | | | | 709/223 |
| 2023/0379356 | A1 * | 11/2023 | Busany | H04L 63/1425 |
| 2024/0089294 | A1 * | 3/2024 | Khedri | H04L 63/10 |
| 2024/0235984 | A1 * | 7/2024 | Chunduri | H04L 45/302 |
| 2024/0305519 | A1 * | 9/2024 | Lewis | H04L 41/145 |
| 2024/0305533 | A1 * | 9/2024 | Bai | H04W 24/02 |
| 2024/0340296 | A1 * | 10/2024 | Brunner | G06N 3/044 |
| 2024/0364749 | A1 * | 10/2024 | Crabtree | H04L 63/20 |
| 2024/0406145 | A1 * | 12/2024 | Crabtree | H04L 63/1425 |
| 2024/0414206 | A1 * | 12/2024 | Crabtree | G06F 16/2477 |
| 2025/0007945 | A1 * | 1/2025 | Rieger | H04L 63/1416 |
| 2025/0016202 | A1 * | 1/2025 | Crabtree | G06F 16/2477 |
| 2025/0047717 | A1 * | 2/2025 | Crabtree | G06F 16/951 |
| 2025/0080569 | A1 * | 3/2025 | Thompson | H04L 63/1433 |
| 2025/0133121 | A1 * | 4/2025 | Crabtree | H04L 63/1433 |

OTHER PUBLICATIONS

Ghorbani-Renani et al. (Mar. 2021). "A Decomposition Approach for Solving Tri-Level Defender-Attacker-Defender Problems," Computers & Industrial Engineering 153; 51 pages.

Hendricksen. (Sep. 2013). "The Optimal Employment and Defense of A Deep Seaweb Acoustic Network for Submarine Communications at Speed and Depth Using a Defender-Attacker-Defender Model," Thesis, Naval Postgraduate School; 118 pages.

Nicholas et al. (Feb. 2015). "Designing Interference-Robust Wireless Mesh Networks Using A Defender-Attacker-Defender Model," Naval Postgraduate School; 71 pages.

Xiang et al. (May 2019). "An Improved Defender-Attacker-Defender Model for Transmission Line Defense Considering Offensive Resource Uncertainties," IEEE Transactions on Smart Grid 10(3):2534-2546.

Yuan et al. (Jan. 2014). "Optimal Power Grid Protection Through A Defender-Attacker-Defender Model," Reliability Engineering & System Safety 121:12 pages.

* cited by examiner

Scenario = 15, J-Budget = 1, D-Budget = 0, TotalCost = 245

FIG. 6B

| Configuration | Receiver Node(s) | Per-Node Rx Data Flow (High Priority) | Per-Node Rx Data Flow (Low Priority) |
|---|---|---|---|
| Benign | All | 10 | 10 |
| Contested | 1, 8 | 10 | 10 |
| | 16 | 10 | 0 |
| Highly Contested | 1 | 10 | 5 |
| | 8 | 10 | 10 |
| | 16 | 10 | 0 |
| 3 Attacks and 1 Defense | 1 | 5 | 0 |
| | 8, 16 | 10 | 10 |

FIG. 6K

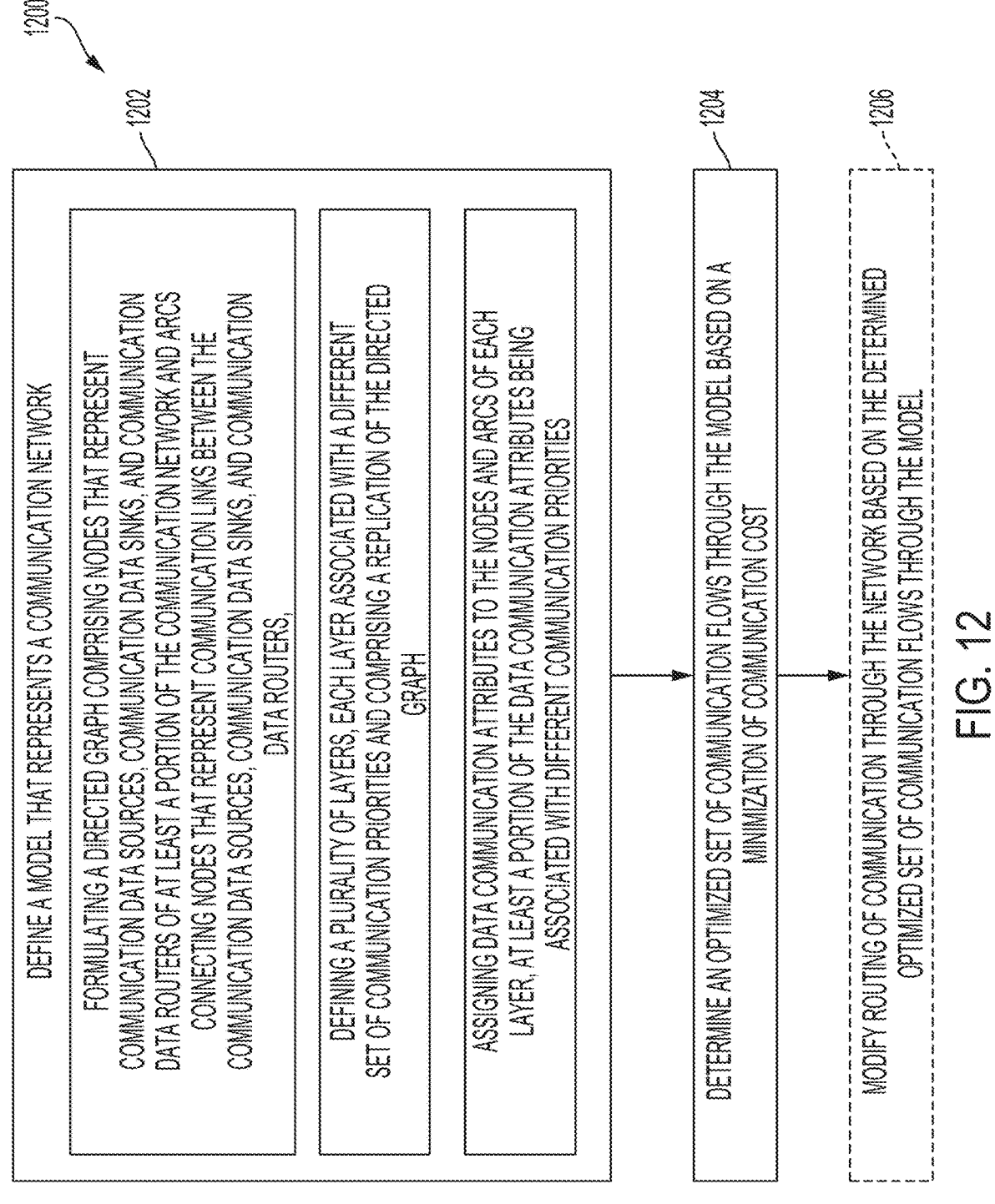

1200

1202

DEFINE A MODEL THAT REPRESENTS A COMMUNICATION NETWORK

FORMULATING A DIRECTED GRAPH COMPRISING NODES THAT REPRESENT COMMUNICATION DATA SOURCES, COMMUNICATION DATA SINKS, AND COMMUNICATION DATA ROUTERS OF AT LEAST A PORTION OF THE COMMUNICATION NETWORK AND ARCS CONNECTING NODES THAT REPRESENT COMMUNICATION LINKS BETWEEN THE COMMUNICATION DATA SOURCES, COMMUNICATION DATA SINKS, AND COMMUNICATION DATA ROUTERS,

DEFINING A PLURALITY OF LAYERS, EACH LAYER ASSOCIATED WITH A DIFFERENT SET OF COMMUNICATION PRIORITIES AND COMPRISING A REPLICATION OF THE DIRECTED GRAPH

ASSIGNING DATA COMMUNICATION ATTRIBUTES TO THE NODES AND ARCS OF EACH LAYER, AT LEAST A PORTION OF THE DATA COMMUNICATION ATTRIBUTES BEING ASSOCIATED WITH DIFFERENT COMMUNICATION PRIORITIES

1204

DETERMINE AN OPTIMIZED SET OF COMMUNICATION FLOWS THROUGH THE MODEL BASED ON A MINIMIZATION OF COMMUNICATION COST

1206

MODIFY ROUTING OF COMMUNICATION THROUGH THE NETWORK BASED ON THE DETERMINED OPTIMIZED SET OF COMMUNICATION FLOWS THROUGH THE MODEL

FIG. 12

SYSTEMS AND METHODS FOR NETWORK RESILIENCY

CROSS-REFERENCE TO RELATED APPLICATIONS

This application claims the benefit of U.S. Provisional Application No. 63/348,925, filed Jun. 3, 2022, the entire contents of which is incorporated herein by reference.

FIELD

This disclosure generally relates to communications networks and, more specifically, to resiliency of communications networks.

BACKGROUND

Communications networks include a number of nodes and a number of connections between nodes for data to traverse between nodes. Communications networks include a level of redundancy such that multiple paths through nodes and connections exist between nodes. Communications networks can make decisions about how data is routed through these multiple paths. This redundancy allows for a level of resiliency of the network in the event that a node and/or connection is compromised, such as due to adversarial attacks, since data may be rerouted through different nodes and connections.

SUMMARY

According to various aspects, systems and methods use a prescriptive network resiliency model configured to determine optimal communication data routing through a network, identify network weakness that may be exploited by one or more adversaries, and/or identify ways to defend the network to maximize resiliency. According to various embodiments, a communications network is modeled as a directed graph with nodes representing communication data sources, sinks, and routers of the network and arcs connecting the nodes representing communications flow paths between the data sources, sinks, and routers of the network. Attributes of the nodes and arcs define in the model the communications flow demand and constraints. The directed graph structure and the attributes can be used to determine communication routing through the network that minimizes operational cost.

According to an aspect, a method includes: defining a model that represents a communication network, wherein defining the model comprises: formulating a directed graph comprising nodes that represent communication data sources, communication data sinks, and communication data routers of at least a portion of the communication network and arcs connecting nodes that represent communication links between the communication data sources, communication data sinks, and communication data routers, defining a plurality of layers, each layer associated with a different set of communication priorities and comprising a replication of the directed graph, and assigning data communication attributes to the nodes and arcs of each layer, at least a portion of the data communication attributes being associated with different communication priorities; and determining an optimized set of communication flows through the model based on a minimization of communication cost.

Optionally, the method may include modifying routing of communication through the network based on the determined optimized set of communication flows through the model.

The attributes of a node may include at least one of a supply of and a demand for communication data.

At least one node may be a source and a sink.

Optionally, there is no communication flow between the layers.

The model may include limits for communication flows through the nodes of the network and the optimized set of communication flows may include, for each node, a total communication flow across the layers that does not exceed the limit for the respective node.

The communication cost may be a function of a cost penalty associated with a shortfall in meeting a source or supply demand.

The communication cost may be a function of a cost to traverse an arc.

Determining an optimized set of communication flows may include determining a total number of data units traversing each arc of each layer.

Determining the optimized set of communication flows may include simulating an attack on the network by increasing a cost for traversing and/or a reduction in the capacity of at least one arc.

Determining the optimized set of communication flows may include simulating a defense of the network by restricting at least one arc from being attacked.

According to an aspect, a computing system includes one or more processors, memory, and one or more programs stored in the memory for execution by the one or more processors for causing the computing system to perform any of the above methods.

According to an aspect, a non-transitory computer readable medium stores one or more programs for execution by one or more processors of a computing system to cause the computing system to perform any of the above methods.

BRIEF DESCRIPTION OF THE FIGURES

The invention will now be described, by way of example only, with reference to the accompanying drawings, in which:

FIGS. 2A-1, 2A-2, 2A-3, and 2B illustrate exemplary representations of various aspects of a single exemplary communications network that implements three logical slices;

FIG. 3 illustrates exemplary attributes that may be associated with nodes that may be used for optimizing for network resiliency;

FIGS. 6A-6K illustrate exemplary network resiliency optimization utilizing slices for an exemplary network in four different scenarios—benign (no attack), contested (attacks on one or more arcs) without defense, highly contested without defense, and highly contested with defense;

FIG. 12 is a flow diagram of an exemplary method; and

DETAILED DESCRIPTION

Figure 1:
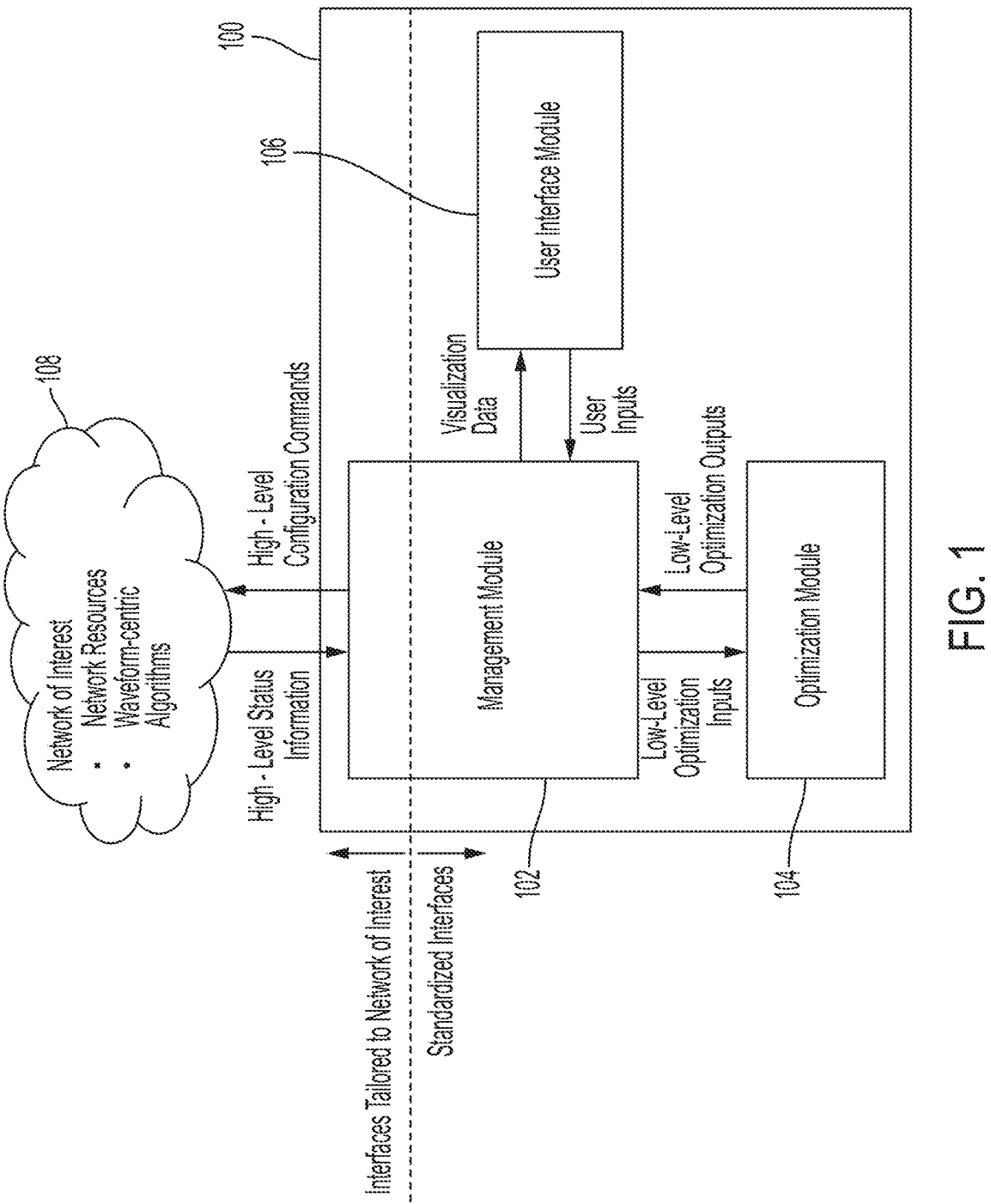
FIG. 1 is a functional block diagram of an exemplary prescriptive network resiliency system.

Described herein are systems and methods for increasing communication network resiliency using a prescriptive network resiliency model configured to determine optimal communication data routing through the network, identify network weakness that may be exploited by one or more adversaries, and/or identify ways to defend the network to maximize resiliency. According to various embodiments, a communications network is modeled as a directed graph with nodes representing communication data sources, sinks, and routers of the network and arcs connecting the nodes representing communications flow paths between the data sources, sinks, and routers of the network. Attributes of the nodes and arcs define in the model the communications flow demand and constraints. The directed graph structure and the attributes can be used to determine communication routing through the network that minimizes operational cost. The operational cost may be a function, for example, of the cost of communication data flowing through particular nodes and/or arcs and/or penalties for communication data demands not being met. Different communication data priorities can be accounted for in the model by decomposing the directed graph into multiple layers (also referred to herein as slices) of identical node and arc structure but with different attributes that reflect different communication priorities for the different layers. Optimization of data flow within all of the different layers may be solved together with the total data flow for a given node across all layers being constrained by the node's overall data handling constraints. Thus, the systems and methods can prioritize some data flow through a node over other data flow through the same node, rather than treating all data flow through the node as the same.

The systems and methods described herein can be used to plan for and/or defeat a peer adversary via identification of network weak points and identification of alternate data paths in the event of an attack ("attack" is used herein as a shorthand for any cause of a reduction in capacity and/or increase in in cost (e.g., an elevated security risk when using a particular data path) for data to traverse across a data path between two nodes of a network and can include radio frequency jammers, cut wires, power outages, software-based failures, etc.). The systems and methods may implement a defender-attacker-defender algorithm (referred to below for simplicity as DAD) to assess the effects of a peer adversary on a network. While this problem may be simple to solve via exhaustive enumeration when the number of combinations is small, the problem quickly becomes intractable for real-world directed graphs. The DAD approach described herein is capable of application to larger graphs to not only select alternate data paths in response to prior attacks but to also recommend which assets to preemptively defend against future attack. The DAD approach described herein models the actions of interacting "players" and offers a game theoretic framework for modeling the following: ways to protect network infrastructure from attack by building defenses; an adversary who sees those defenses and attacks in a maximally harmful way; and an operator who observes the attacks and reconfigures the network infrastructure to the best of their reduced ability. Through this approach, the systems and methods described herein can minimize disruption to a network against worst-case attacks. The systems and methods may provide a quantitative evaluation of the attack's disruption through comparison of benign and attacked operational costs (an attack increases the cost to operate a system) and/or a quantitative evaluation of the protection's mitigation of the attack through comparison of attacked and defended operational costs (a defense reduces the cost to operate an attacked system). Systems and methods may not only find an optimal data path in benign environments but also find alternate minimum cost data paths when adversary activities are present. Further, systems and methods may find alternate data paths as a function of the adversary's budget (i.e., changing ability to do harm).

The DAD approach described herein does not rely on exhaustive evaluation of data path combinations as capabilities degrade due to adversary actions. Rather, the DAD approach relies on a decomposition approach that includes attack generation on an as-needed basis in addition to other optimization techniques. The systems and methods described herein may be efficient at finding optimal solutions out of huge numbers of possibilities, until the point at which computing resources are fully utilized.

The DAD approach described herein is a sequential game with three players. All players know the "rules of the game" in advance. Each player can see the actions of all prior turns, but has no knowledge of future turns. For clarity, the players are referred to herein as "defender", "attacker" and "operator". The defender and operator both strive to minimize system cost, though in different ways. The attacker (smart adversary) strives to cause damage that maximizes system cost. The concept of system cost is an abstraction and is a function of the amount of communication data traversing the network (efficient use of resources) and the degree to which each node's communication demands are met (shortfall penalty for unmet demand). A defender acts pre-emptively without knowledge of subsequent attacker or operator activities. Defender activities may make it impossible for an attack to occur on a connection or may otherwise reduce the ability of an attacker to cause damage to a connection. Defenders do not determine satisfaction of data sink requests or determine how data is to be routed. An operator acts reactively based on knowledge of prior defender and attacker activities. Operator activities do not influence the ability of the defender or attacker to prevent or cause damage. Operators determine satisfaction of data sink requests and determine how data is to be routed. Thus, according to the principles described herein, a defender decides what arcs to defend while an operator decides how to route data in view of any defender actions and attacker actions.

The DAD approach described herein may implement three sequential turns: Turn #1: The defender spends its budget defending one or more arcs.—The defender does not know what future actions the attacker or operator will take.—Defended arcs cannot be attacked (or more properly, a defended arc does not incur an attack penalty).—The defender tries to minimize the attacker's maximization of the minimum operating cost. Turn #2: The attacker spends its budget attacking one or more arcs.—The attacker can see which arcs have been defended, but does not know what future actions the operator will take.—The operator incurs a penalty when communication data traverses an attacked arc.—The attacker tries to maximize the minimum operating cost as a function of the prior defense activities. Turn #3: The operator determines how communication data flows across the network.—The operator can see which arcs have been defended and which arcs have been attacked.—The operator tries to configure the network such that the operating cost is minimized as a function of the prior defense and attack activities. The defender and/or attacker budgets can be set to zero for simulating benign operation of the network.

Using as an example a terrestrial communication network where connections between nodes are implemented with fiber optic cables, defender activities, according to the principles described herein, occur without knowledge of subsequent attack or operator activities. Defense activities may include physical controls such as: enclosing the fiber optic cables inside hardened conduit, which may entirely prevent an attack or may increase the time and effort associated with attacking the cable, and/or increasing the presence of security personnel and/or video surveillance in the vicinity of the fiber optic cables, which increases the chance of an attacker being caught when attacking the cable. Attacker activities, according to the principles described herein, occur with knowledge of above prior defense activities. Attacker activities may include: cutting or bending of a fiber optic cable, which causes a full or partial reduction in the operational capacity (data throughput) of that cable, and/or inserting an optical splitter that allows the attacker to observe communication data, which increases the operational security risk of data compromise. This latter exemplary attacker activity is an example where an attack may not decrease the capacity across a data path, but it does increase the operator cost (in terms of security risk) to use that data path. Operator activity, according to the principles described herein, occurs with knowledge of the prior defense and attacker activities. The operator activity is to route data. This can include deciding which data sink requests to satisfy (full, partial or no satisfaction), and/or determining the source-to-sink data paths over which data is to be routed, which may be different for each data priority level.

The DAD approach can be summarized as follows: let w be a defense activity that is an element of the set of defense activities W; let x be an attacker activity that is an element of the set of attacker activities X(w) (note that the set of attacker activities is a function of the defense—i.e., the attacker can "see" the defense); let y be an operator activity that is an element of the set of operator activities Y (w, x) (note that the operator can "see the defense activity and the attacker activity); the DAD approach described herein takes the following form: $\min(w\in W) \max(x\in X(w))\min(y\in Y(w, x))f(w, x, y)$, where $f(w, x, y)$ is the cost of operator activity y in the presence of attacker activity x and defense activity w.

Reference to an "optimal" solution is made at various times herein. While an absolute optimal solution may be reached in some instances, this term is used more broadly herein to refer to an optimal solution within a period of computation time. In other words, a given optimization may be terminated early depending on the user's requirements. When terminated early, a solution may not be an absolute optimal solution, but the solution may be considered optimal for the available execution time. The ability to trade between larger optimality gaps and shorter executions times may be desirable for a given user.

According to various embodiments, the systems and methods do not implement a detailed communication network simulator. Rather, the systems and methods may optimize based on a constrained network representation and objective function that represents any given communication network with a limited degree of fidelity.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 is a functional block diagram of an exemplary prescriptive network resiliency system 100 configured to determine optimal communication data routing through the network, identify network weakness that may be exploited by one or more adversaries, and/or identify ways to defend the network to maximize resiliency. Network resiliency system 100 may be implemented on any suitable computing system, including a cloud computing system or standalone computing system. The network resiliency system 100 can include a management module 102, an optimization module 104, and a user interface module 106. The network of interest 108 can be external to the prescriptive network resiliency system 100. The optimization module 104 may receive low-level input parameters from the management module 102, execute one or more low-level optimization algorithms, and provide low-level outputs to the management module 102.

The management module 102 may configure a network resiliency model of the network of interest 108, provide a bi-directional exchange of high-level information with the network of interest 108, provide a bi-directional exchange of medium-level information with the user interface module 106, and provide a bi-directional exchange of low-level information with the optimization module 104.

High-level information can include high-level configuration commands (as illustrated in FIG. 1) sent to the network of interest, which can include data routing recommendations. For example, for data being routed from a source node to a sink node at a specific priority level, a routing recommendation can include a specified amount of data that is to be routed across a list of nodes in the network (e.g., 4 data units at priority 100 start at source node 1, then go to node 5, then go to node 7, and finally reach sink node 10). The network of interest can use the data routing recommendations to re-route through the network. Optionally, the management module 102 may convert a recommendation from a native format to a format understood by the network of interest (e.g., a data unit in the native format of system 100 may be mapped to a multiple of a T1 data rate in the network of interest). High-level information can include high-level status information (as illustrated in FIG. 1) received from the network of interest. This status information can include the current data capacity of each arc. The status information can include the current status of each node, such as the node's data demands, the priorities the data demands are associated with, and/or the maximum transmission data rate of a source node. This information can be translated by the management module from a format native to the network of interest to the low-level parameters understood by the optimization module 104.

Medium-level information exchanged with the user interface module 106 can include visualization data, which can include information needed to generate visual status regarding the network of interest. This may include: a list of arcs that the optimization module 104 identifies as optimal from an attack perspective (this doesn't mean the arc is actually being attacked at that moment, but rather, is information for the user to better understand vulnerabilities); a list of arcs that optimization module 104 recommends to be defended (e.g., from a planning perspective); data routing and priority information; the degree to which each sink node's data demand is satisfied; a list of node IDs; position information for each node ID; source node and sink node associated with each directed arc; current data capacity for each directed arc; actual current attack state for each arc based on network telemetry; and/or actual current defense state for each arc based on network telemetry.

Medium-level information exchanged with the user interface module 106 can include user inputs from the user interface module, which may include: attack budget available for optimization module 104 to make attack recommendations; defense budget available for optimization module 104 to make defense recommendations; and/or for each data demand: source node ID, sink node ID, data priority, and/or level of data demand (e.g., data rate).

Low-level information exchanged with the user interface module 106 can include any of the low-level input parameters provided to the optimization module 104.

The user interface module 106 may receive network topology, status, and visualization information from the management module 102, display resiliency information visually to a user, accept user inputs, and provide user input data to the management module 102. Management module 102, optimization module 104, and user interface module 106 are to be understood as functional modules that may be implemented in software executed on any suitable computing system, including a cloud computing system. These modules may be implemented on the same computing system or may be implemented on a plurality of computing systems that are interconnected by a communication network.

The optimization module 104 may utilize evolutionary, linear, non-linear, integer, and/or binary optimization algorithms to analyze the network resiliency model of the network of interest 108. The mathematical optimization performed by optimization model 104 may comprise a tri-level structure in which contrasting goals from three actors interact in a global optimization across the model of the network of interest 108. The first actor may correspond to the network operator, whose goal is to minimize the operating cost of the network 108. The second actor may correspond to an attacker, whose goal is to maximize the minimum operating cost of the network 108. The third actor may correspond to a defender, whose goal can be to minimize the attacker's maximization of the minimum operating cost of the network 108.

The optimization module 104 may implement optimization algorithm(s) that utilize a game theoretic structure in which the defender takes the first turn without knowledge of subsequent attacker and operator actions. The attacker may take the second turn with knowledge of the prior defender action but without knowledge of the subsequent operator action. The operator may take the third and final turn with knowledge of prior attacker and defender actions. The attacker and defender activities may be subject to budgetary constraints.

The optimization module 104 may accept any network topology for the network of interest 108 from the management module 102 that is represented as a directed or undirected graph (i.e., a set of nodes and arcs). Nodes of the graph may represent data sources, data sinks, and data routers of the network of interest 108, including any combinations of these. Data exchanged between nodes in the graph may be unicast or multicast. Nodes may be equivalent to 5G Next Generation NodeBs (gNBs) and 5G User Equipment (UE). Arcs may be equivalent to the 5G New Radio interface between gNBs and UE. Other examples of nodes include fielded end-user terminals in a commercial or military satellite communication network, network hub terminals (within a command center or network operation center) in a commercial or military satellite communication network, personal computers and mobile devices in a commercial network, and enterprise network equipment (routers, servers, switches, hubs, etc.) hosted by a commercial network service provider.

Prescriptive network resiliency system 100 may be used for networks that do not employ network slicing and may also be used on networks that do employ network slicing (e.g., as employed by 5G), in which a logical subnet (referred to herein interchangeably as layer and slice) of the physical network has operating parameters specific to the data transported over that subnet. The scope of some operating parameters may be local to the physical resources themselves, for example, the total physical data transmission capacity of an arc. The scope of other operating parameters may be local to the logical subnet, such as the portion of the total data transmission capacity of an arc that can be utilized by that slice. The sum of capacities across all slices may not exceed the total physical capacity for that arc. Similarly, the sum or combination of other subnet characteristics may not exceed the corresponding total physical limit for that characteristic. Slices may be defined such that there is no communication flow between the slices.

The optimization module 104 may treat nodes of the network resiliency model as being of three node types: source, sink, and router. The scope of node types may be local to the logical subnet. This structure enables a capability where a node may simultaneously be a source in one set of one or more subnets, a sink in a second mutually exclusive set of one or more subnets, and a router in a third mutually exclusive set of one or more subnets.

Low-level input parameters (also referred to herein as attributes) for the network resiliency model that may be provided to the optimization module 104 by the management model 102 may include:

Arc Count: Defines the total number of directed arcs in one slice. All slices have the same number of arcs.

Arc Source: Specifies the Node ID (defined below) for the source of data traversing each arc, where the number of arcs is defined by Arc Count.

Arc Sink: Specifies the Node ID (defined below) for the sink of data traversing each arc, where the number of arcs is defined by Arc Count. Note that any arc can be uniquely identified by the associated (Arc Source, Arc Sink) 2-tuple.

Node Count: Defines the total number of nodes across one slice. All slices have the same number of nodes.

Node ID: Defines a unique identifier for each node, where the number of nodes is defined by Node Count.

Slice Count: Defines the total number of slices.

Node Supply/Demand: Defines the supply (positive value, associated with a source node) or demand (negative value, associated with a sink node) for each (node, slice) 2-tuple. For example, if a sink node has a demand of 5 data units in a particular slice, the corresponding node demand value for that node in that slice is −5. Data demand can be, for example, data volume (e.g., amount of data being requested, such as in MB) and/or can be "data rate" (e.g., data volume divided by time).

For example, many commercial network systems define data rates in terms of "T-Carriers". The T1 data rate corresponds to 1.544 Mbps, and other designations are multiples of the T1 data rate: T2 is four times the T1 data rate, T3 is 28 times the T1 data rate, T4 is 168 times the T1 data rate, and T5 is 250 times the T1 data rate. In the optimization module 104, such data rates can be normalized, such as normalizing a base rate to a value of 1, with other data rates being multiples of the base rate. For example, T1 could be normalized to a demand of 1 data unit, with T2 being 4 data units, T3 being 28 data units, T4 being 168 data units, and T5 being 250 data units. As another example, if the network of interest is an optical network, the data rate can be based on "optical carrier levels" (where OC-1 is 51.84 Mbps) instead of T1. The arc/connection capacity units can be made consistent with the data rate units. For example, if data demands are normalized to T1, then arc/connection capacities may also be normalized to T1.

Node Shortfall Penalty: Defines the per-data unit penalty for unmet demand for each (node, slice) 2-tuple. This parameter is also referred to as the data priority (higher Node Shortfall Penalty corresponds to higher data priority). For example, if a sink node in a particular slice has a shortfall penalty of 2, a demand of −7, and receives a total of 3 data units (i.e., a data shortfall of 4 data units), then total cost due to unmet demand for that node in that slice is the shortfall penalty (2) multiplied by the data shortfall (4), which is 8.

Arc Traversal Cost: Defines the per-data unit arc traversal cost for each (arc, slice) 2-tuple. For example, if an arc has a traversal cost of 3 in a particular slice and carries 4 data units in that slice, then the total traversal cost for that arc in that slice is 3*4=12.

Arc Cost to Defend: Defines the cost to defend an arc. A defense applies to every instance of that arc in all slices.

Arc Cost to Attack: Defines the cost to attack an arc. An attack applies to every instance of that arc in all slices.

Arc Capacity: Defines the maximum number of data units per arc. This parameter limits the sum of arc flows across every instance of that arc in all slices. If an arc capacity is 10 data units, then the sum of data units traversing that arc across all slices must be less than or equal to 10 data units.

Arc Attack Capacity Reduction: Defines the amount that an arc's data capacity is reduced (with respect to Arc Capacity) when that arc is under attack. If an arc's capacity is 10, and the arc attack capacity reduction is 3, then that arc has a reduced capacity of 10−3=7 when under attack.

Arc Attack Traversal Cost Penalty: Defines the amount that an arc's traversal cost is increased (with respect to Arc Traversal Cost) when that arc is under attack. If an arc's traversal cost is 5 in a particular slice, and the attack traversal cost penalty is 3, then the per-data unit cost of traversal for that arc in that slice is 5+3=8 when under attack. This input may be the same for all slices or may be slice specific.

Attack Budget: Defines the upper limit of the total cost of all attack activities across all arcs.

Defense Budget: Defines the upper limit of the total cost of all defense activities across all arcs.

The optimization module 104 may apply the above parameters for a network resiliency model to one or more optimization algorithms to generate outputs (also referred to herein as low-level output) associated with recommendations and measures of network resiliency for network resiliency model. Examples of outputs of the optimization module 104 include:

Objective Value: Defines the optimized value of the objective function, which is equal to the minimum cost to operate the network of interest 108 in the presence of attacks (if the attack budget is greater than zero) and defenses (if the defense budget is greater than zero).

Recommended Flows: Defines the recommended total number of data units traversing each (arc, slice) 2-tuple. A network may implement the recommendation, or it may do otherwise.

Recommended Paths: Defines the path (ordered list of arcs, along with the number of data units) across the network for each (source node, sink node, Node Shortfall Penalty) 3-tuple. Each path starts at the source node and ends at the sink node. A network may implement the recommendation, or it may do otherwise.

Node Shortfall: Defines the data shortfall (unmet demand) for each (node, slice) 2-tuple. This value represents the shortfall that will occur if the flow recommendation is implemented.

Figures 1, 2A:
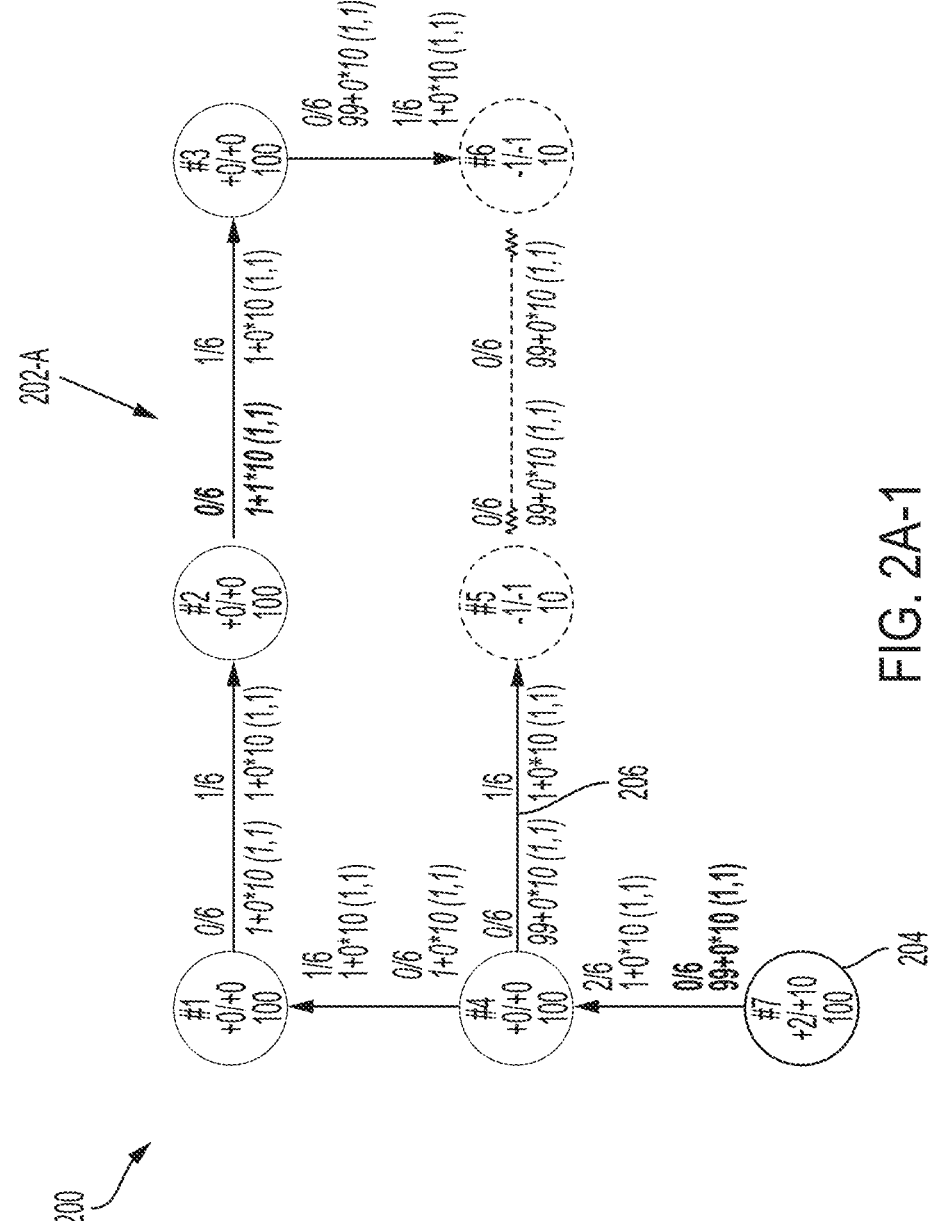
Figures 2, 2A:
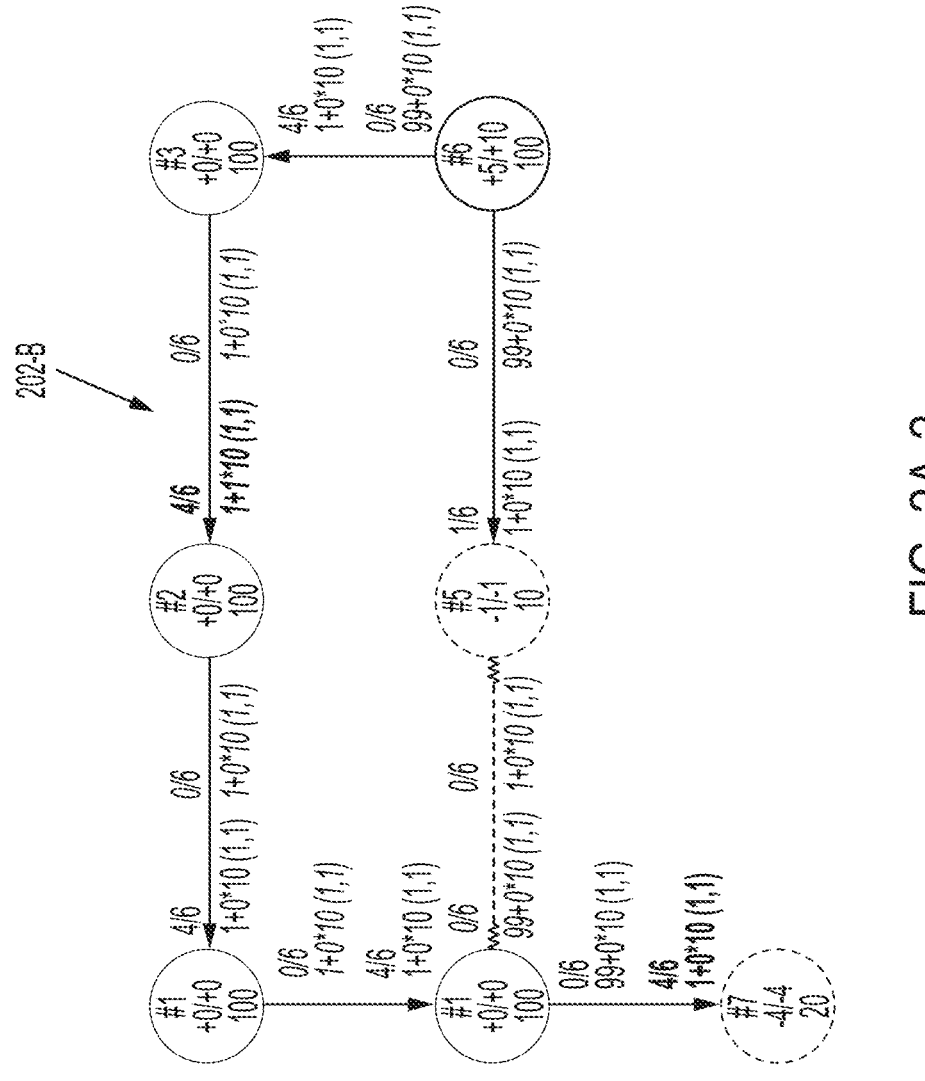
Figures 2, 2A, 3:
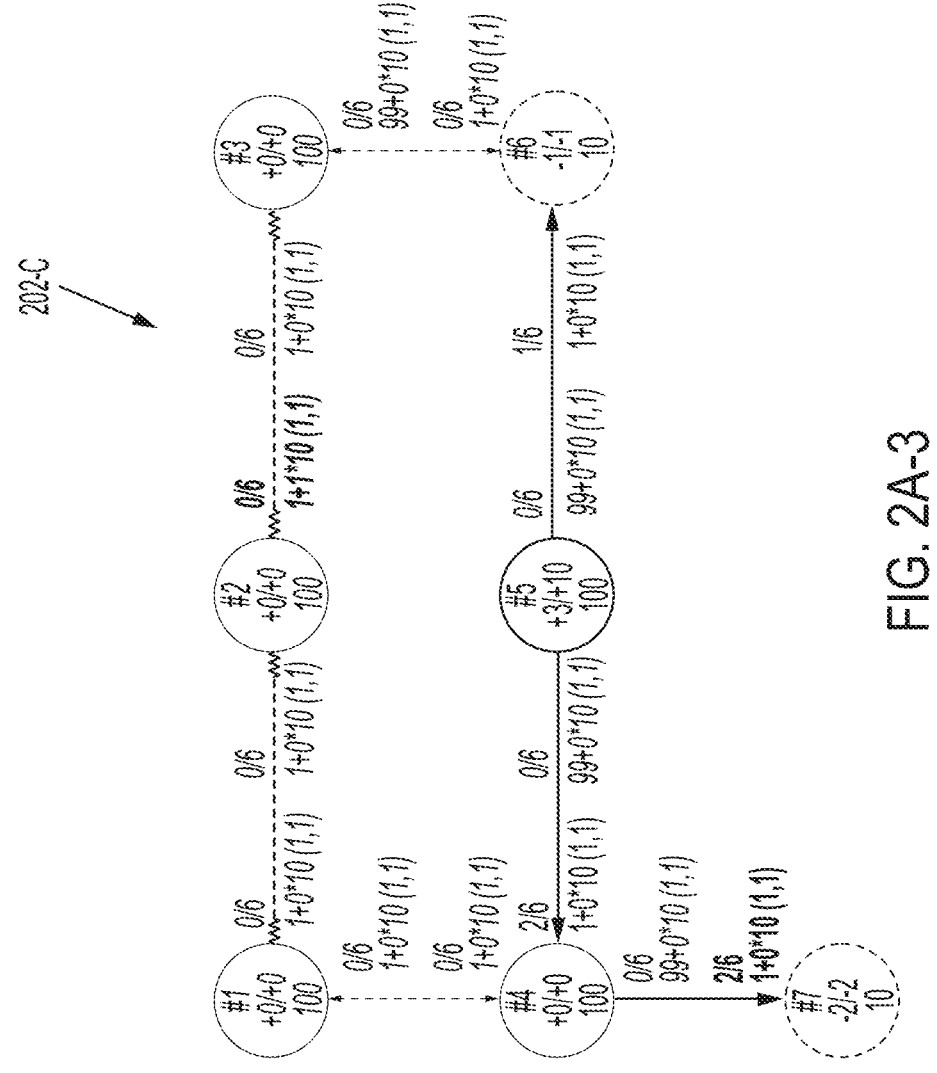
Figure 2B:
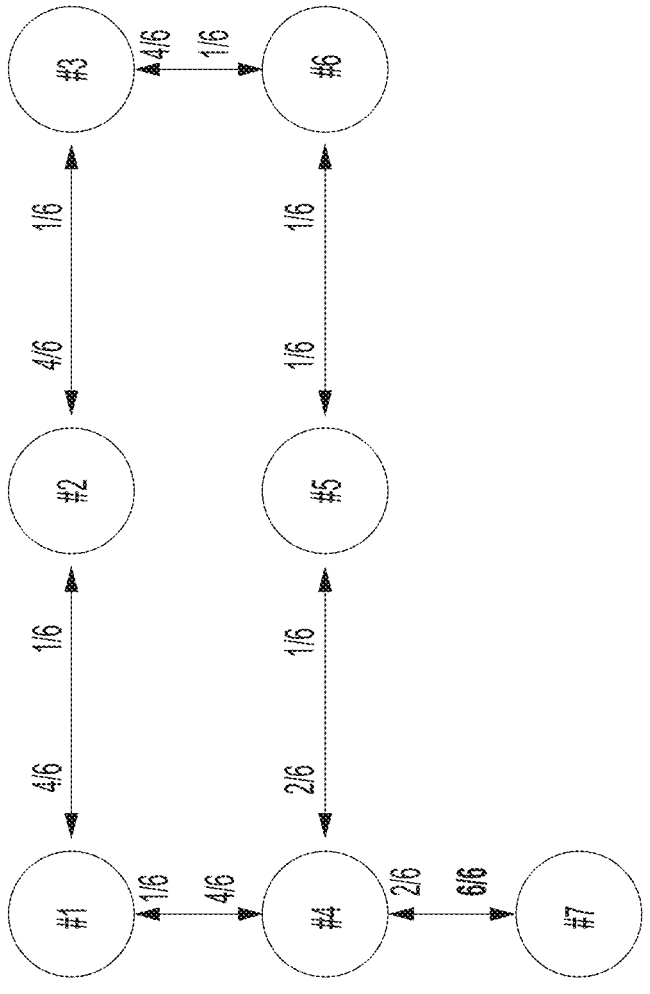
Figure 3:
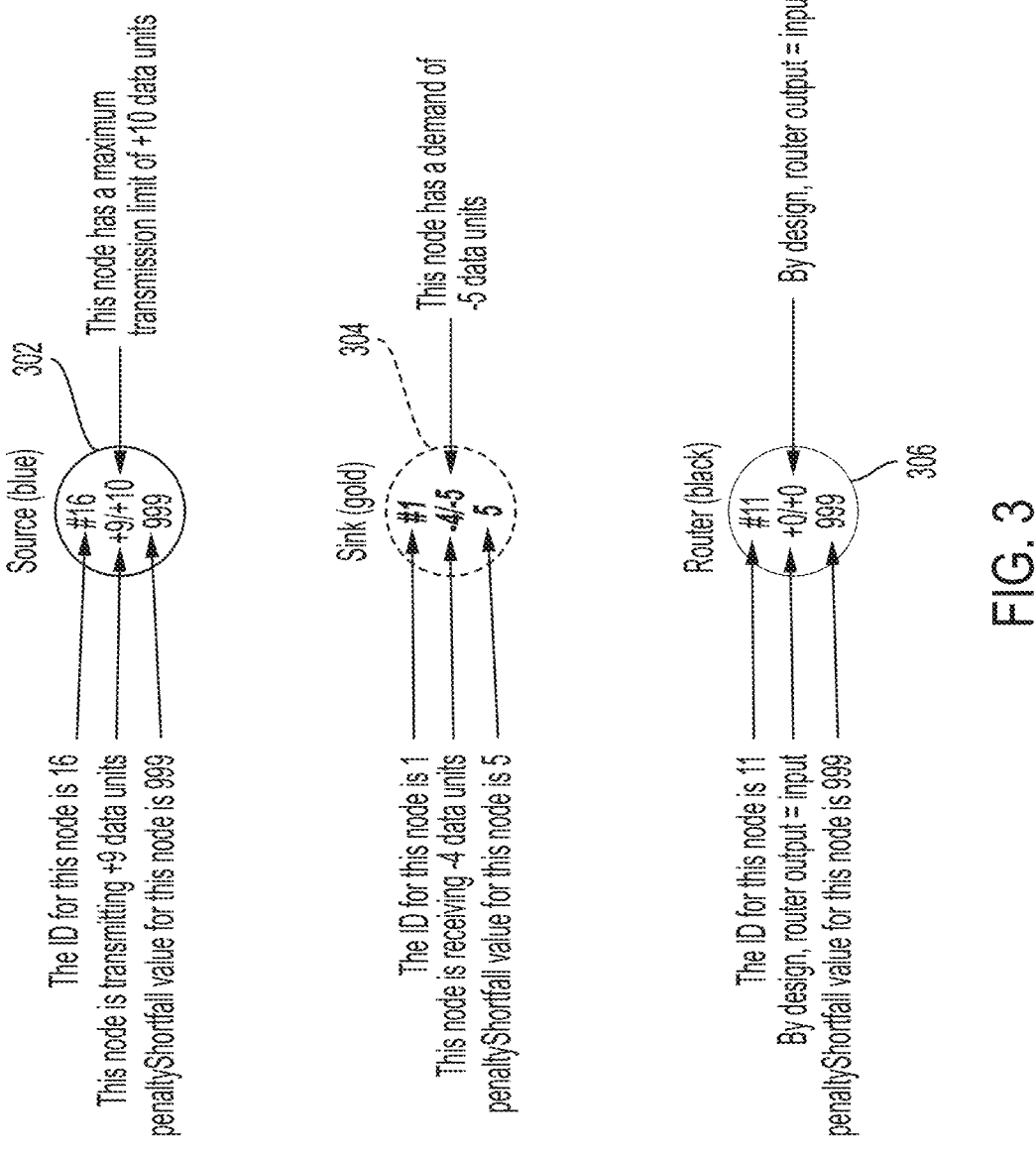

FIGS. 2A and 2B illustrate exemplary representations of various aspects of a network resiliency model 200 of a single exemplary communications network that implements three logical slices. FIG. 2A is a per-slice view of the network model 200 and FIG. 2B is an aggregate view of the three slices of the network model 200. The network resiliency model 200 includes three slices—slice 202-A, slice 202-B, and slice 202-C. The network resiliency model 200 includes a plurality of nodes 204 connected by a plurality of arcs 206. The per-slice view of FIG. 2A depicts the number of data units traversing each arc on a slice-by-slice basis and is helpful to visualize data associated with individual (source node, sink node, Node Shortfall Penalty) 3-tuples. The aggregate (or overview or summary) view of FIG. 2B depicts the sum of data units traversing each arc across all slices and is helpful to visualize total arc flow and sink node shortfall. The illustrated network resiliency model 200 includes seven nodes 204 (numbers 1 through 7) connected by seven arcs 206. As explained further below, characteristics and parameters of the nodes 204 and arcs 206 are provided in the illustrated network resiliency model 200 using numbers as well as different node and arc line styles. Since a node 204 can have different characteristics within each slice, the same node may be depicted differently within each slice. For example, node #7 is a source node is slice 202-A but a sink node in both slices 202-B and 202-C, which is shown by the different line styles used for depicting node #7 in each slice. The various numbers and line styles used in FIG. 2A are explained further below.

FIG. 3 illustrates examples of at least some of the attributes associated with nodes (e.g., nodes 204 of FIG. 2A) that are used by the optimization module 104 for optimizing for network resiliency. As noted above, there are three node types. A source node 302 includes attributes (low-level input parameters provided to the optimization module 104 from the management module 102) such as the quantity of data units transmitted by the node (positive indicates data units sent), the maximum transmission limit, and a shortfall penalty that can specify the optimization cost for exceeding the maximum transmission limit for the node (e.g., as a cost-based interdiction method to ensure a source node does not exceed its maximum transmission limit). A sink node 304 includes attributes (low-level input parameters provided to the optimization module 104 from the management module 102) such as the number of data units being received (negative indicates data units received), the demand of data units, and a shortfall penalty that can specify the optimization cost for not meeting the demand. A router node 306 is configured such that its input equals its output—i.e., the router neither generates data for transmission nor consumes data received (which may be low-level input parameters provided to the optimization module 104 from the management module 102). A shortfall penalty (low-level input parameters provided to the optimization module 104 from the management module 102) can also be specified (e.g., as a cost-based interdiction method to ensure a router node does not spuriously generate data). Each node can include a unique identification. For example, node 302 is labeled with identification number "16" and node 304 is labeled with identification number "1".

Figure 4:
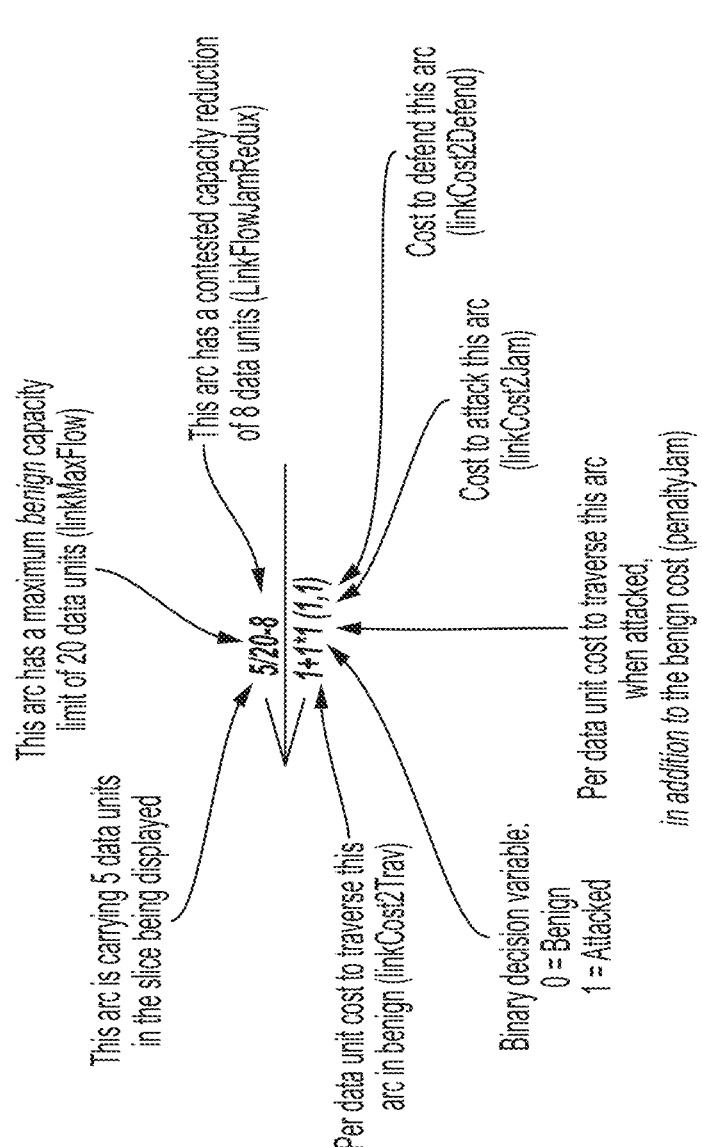
FIG. 4 illustrates exemplary attributes associated with exemplary arcs that may connect nodes of an exemplary network graph.

FIG. 4 illustrates at least some of the attributes associated with arcs (e.g., arcs 206 of FIG. 2A) that connect nodes of a network graph (e.g., network resiliency model 200 of FIG. 2A). Attributes for arcs include the directionality of data transmission (the location of the arrow head), the number of data units being carried (in the example, the arc is carrying 5 data units), the maximum capacity under normal operation (in the example, the maximum capacity when not attacked is 20 data units), a reduction in capacity associated with an attack or other cause of a capacity reduction (in the example, the contested capacity reduction is 8 data units), a per data unit cost to traverse an arc under normal operation (in the example, the cost for a data unit to traverse the arc is 1), a binary decision variable associated with normal operation (also referred to as benign) versus attacked ("attack" is used herein as a shorthand for any cause of a reduction in capacity across an arc and can include radio frequency jammers, cut wires, power outages, software-based failures, etc.), the per data unit cost to traverse an arc when attacked (in the example, the cost for a data unit to traverse the arc when the arc is attacked is 1), the cost to attack an arc (in the example, the cost to attack an arc is 1), and the cost to defend an arc (in the example, the cost to defend an arc is 1).

The optimization module 104 can implement a data priority parameter that specifies the relative importance of various data services to each sink node. The data priority parameter may be local to a logical subnet (slice). This mapping of data priorities to slices enables a capability where a single sink node may make multiple data requests from a single source node where each request is associated with a different data priority level and no two requests exist in the same logical subnet. Similarly, this structure enables a capability where a single sink node may make multiple data requests from different source nodes where each request is associated with a different data priority level.

Figure 5A:
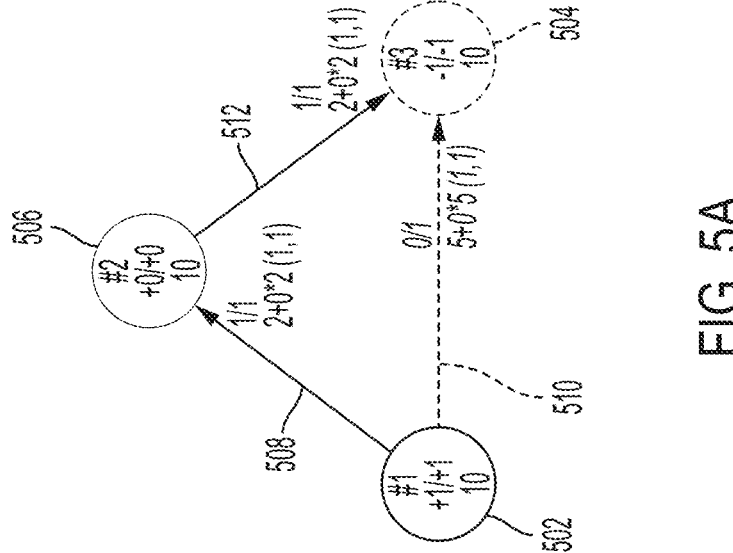
FIGS. 5A-5B illustrate aspects of an exemplary optimization for a simplified example network topology.
Figure 5B:
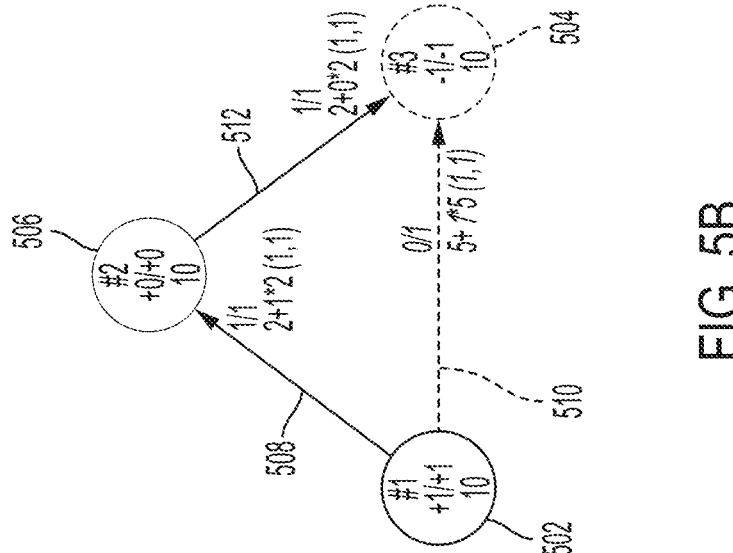

FIGS. 5A-5B illustrate aspects of an optimization for a simplified example network topology 500 that may be performed by optimization module 104, according to various embodiments. FIG. 5A depicts a particular scenario of data traversing the example network, illustrating at least some of the parameters of the network topology 500 that may be used for optimization. The network topology 500 includes three nodes, one source node 502, one sink node 504, and one router node 506. Source node 502 is connected to router node 506 by arc 508 and to sink node 504 by arc 510. Router node 506 and sink node 504 are connected by arc 512. Arcs 508 and 512 are shown with a line style indicating that the arcs are carrying communication data, in the directions indicated by the arrows (an arc could have two arrow heads, indicating bi-directional transmit of data).

The nodes and arcs include notations that indicate values of parameters described above with respect to FIGS. 3 and 4. Source node 502 (labeled node "#1") is transmitting 1 data unit, which is also its maximum transmission capacity, and has a data transmission shortfall penalty of 10. Sink node 504 is receiving one data unit, which is also its maximum reception capacity, and has a data reception shortfall penalty of 10. Arc 508 is carrying 1 data unit from source node 502 to router node 506. 1 data unit is also its maximum benign (not being attacked) data transmission capacity. The per data unit cost to traverse arc 508 is 2. Arc 508 is not being attacked, so the binary decision variable is 0. The per data unit cost to traverse arc 508 when it is being attacked is 2. The cost to attack arc 508 and to defend arc 508 are both 1. Arc 512 is carrying 1 data unit from router node 506 to sink node 504. Like arc 508, arc 512 has a maximum data transmission capacity of 1 data unit, a per data unit cost to traverse arc 508 of 2, a binary decision variable of 0 (not being attacked), a per data unit cost to traverse when attacked of 2, and costs to attack and defend of 1. Arc 510 is not carrying communication data. Its other parameter values are: benign data transmission capacity of 1 data unit; per data unit cost to traverse of 5; binary decision variable of 0 (not being attacked), per data unit cost to traverse when attacked of 5, and costs to attack and defend of 1.

The scenario depicted in FIG. 5A reflects an optimized routing of data through the network in a scenario where the network is not being attacked (or defended). The source node 502 has 1 data unit to send and the sink node 504 has a demand of 1 data unit. The costs to traverse arcs 508 and 512 are each 2 (cost for one data unit to traverse each arc is 2+0*2), which provides a total cost of 4. This is less than the cost to traverse arc 510 (which is 5+0*5=5), and therefore, the data unit is routing via arcs 508 and 512 and router 506.

The scenario of FIG. 5A can be generated by the optimization module 104, implementing the DAD optimization approach, by setting the defender and attacker budgets to zero. In this case, there are no activities associated with the first two turns of the game. There is only one turn, accomplished by the operator. The operator can see which arcs have been defended and which arcs have been jammed (which are none in this case) and configures the network such that the operating cost is minimized as a function of the prior defense and jamming activities (which is none in this case). In the simplified example of FIG. 5A, the operator has three options. A first option is to send one data unit from source node 502 to sink node 504 via router node 506. With this option (which is the action ultimately taken by the operator, the results of which are shown in FIG. 5A), the cost of this option is 4, which is the sum of the cost for one data unit to traverse arc 508 and the cost for one data unit to traverse arc 512, as explained above. The sink node's request for one data unit is met, so there is no shortfall penalty cost. A second option is to send one data unit from the source node 502 directly to the sink node 504 via arc 510. The cost for this option is 5—the cost for one data unit to traverse arc 510, as explained above. The sink node's request for one data unit is met, so there is no shortfall penalty cost. A third option to not send any data units. No data units traverse any arcs, so there is no data traversal cost. However, the sink node's request for one data unit is not met, providing a shortfall penalty cost of 10 (1 data unit×10 per data unit shortfall penalty). Since the optimization module 104 is configured to find the solution that minimizes the operator cost, the first option is determined by the optimization module 104 as the recommended flows and paths. In operational scenarios, a network operator may use this recommendation from the optimization module 104 to control the network nodes such that one communication unit is sent from source node 502 to sink node 504 via router node 506.

FIG. 5B illustrates options available for the simplified example network topology 500 of FIG. 5A for a scenario in which an attacker has an attack budget of 2. The attack budget can be used for planning to simulate adversarial action. In operational scenarios, the network resiliency system 100 can be configured to receive external threat detection data that can indicate arcs that have been attacked. This data can be used to in addition to or in lieu of determining the optimal attacker attack.

In the example in which the attacker has an attack budget of 2, the attacker has six options for attacking (e.g., jamming) the network, which are listed below.

Option 1: attack arc 510

Option 2: attack arc 512

Option 3: attack arc 508

Option 4: attack arc 508 and arc 510

Option 5: attack arc 508 and arc 512

Option 6: attack arc 510 and arc 512.

Note that in options 1-3, the attacker does not spend its entire attack budget. As explained above with respect to FIG. 5A, there are three options available to the operator: send data from source node 502 to sink node 504 via router node 506 (referred to as "upper" below), send data from source node 502 to sink node 504 directly via arc 510 (referred to below as "lower") and don't send any data (referred to below as "shortfall"). For attacker option 1, the costs associated with these operator options are: upper=4 (since arcs 508 and 512 are not being attacked), lower=10 (5+1*5), and shortfall=10 (the shortfall cost). The minimum of these costs, which is provided by the upper route, will be selected by the operator, and as such, the attacker selecting attacker option 1 above will result in a cost of 4 (min(upper, lower, shortfall). For attacker option 2, the upper cost is 6 (cost to traverse arc 508=2+0*2=2 and the cost to traverse arc 512=2+1*2=4), the lower cost is 5, and the shortfall cost is 10. The minimization function for all six attacker options above are:

Attacker Option 1 (attack arc 510): min(upper=4, lower=10, shortfall=10)=4

Attacker Option 2 (attack arc 512): min(upper=6, lower=5, shortfall=10)=5

Attacker Option 3 (attack arc 508): min(upper=6, lower=5, shortfall=10)=5

Attacker Option 4 (attack arc 508 and arc 512): min (upper=8, lower=5, shortfall=10)=5

Attacker Option 5 (attack arc 512 and arc 510): min (upper=6, lower=10, shortfall=10)=6

Attacker Option 6 (attack arc 510 and arc 508): min (upper=6, lower=10, shortfall=10)=6

In view of the options above, the attacker may select either option 5 or option 6 to maximize the cost to the operator.

As noted above, the network resiliency system 100 can model a defender that attempts to counteract at least some attacks of an attacker. The defender may be modeled as having limited resources by providing the defender with a defense budget, much like the attacker can have an attack budget. The defender seeks to minimize the operating cost. Continuing with the example above and providing the defender with a defense budget of 1, the defender has three defense options: option 1—defend arc 508, option 2—defend arc 512, and option 3—defend arc 510. The defender chooses from among these options by determining the costs associated with the attacks the attacker can choose given the defense chosen by the defender, with the constraint that the attacker cannot attack a defended arc. For defense option 1 (defend arc 508), the options available to the attacker and their associated costs are:

Attacker Option 5 (attack arc 512 and arc 510): min (upper=6, lower=10, shortfall=10)=6

Attacker Option 1 (attack arc 510): min(upper=4, lower=10, shortfall=10)=4

Attacker Option 2 (attack arc 512): min(upper=6, lower=5, shortfall=10)=5

Attacker options 3, 4, and 6 are not available because they each involve an attack on arc 508, which is being defended in defense option 1. Since the attacker will choose an attack that results in the highest cost, the cost for defense option 1 is 6, which is the maximum of 6, 4, and 5.

For defense option 2 (defend arc 512), the attacker options are:

Attacker Option 6 (attack arc 510 and arc 508): min (upper=6, lower=10, shortfall=10)=6

Attacker Option 1 (attack arc 510): min(upper=4, lower=10, shortfall=10)=4

Attacker Option 3 (attack arc 508): min(upper=6, lower=5, shortfall=10)=5

So, for defense option 2, the attack with the highest cost is attacker option 6, giving a cost of 6 for defense option 2.

For defense option 3 (defend arc 510), the attacker options are:

Attacker Option 2 (attack arc 512): min(upper=6, lower=5, shortfall=10)=5

Attacker Option 3 (attack arc 508): min(upper=6, lower=5, shortfall=10)=5

Attacker Option 4 (attack arc 508 and arc 512): min (upper=8, lower=5, shortfall=10)=5

So, for defense option 3, each attack has a cost of 5, giving a maximum cost for defense option 3 of 5. The defender's goal is to minimize the cost and, thus, the defender choses the least costly of the three defense option, which is defense option 3 (having a cost of 5 versus the cost of 6 for the other two options).

Summarizing the above, when the attack and defense budgets are zero, the operator can freely minimize the operational cost. As a result, the lowest possible operational cost of 4 units (benign) is achieved. When the attack budget is non-zero, attack activities (e.g., jamming) negatively impact the operator's ability to minimize cost. As a result, operational cost increases from 4 units (benign) to 6 units (jammed). When both the attack budget and defense budget are non-zero, defense activities reduce the negative impact of the jammer. As a result, operational cost is 5 units (jammed with defense), which falls between the benign and jammed operational costs As noted above, slices can be used to define different communications data traffic priorities between nodes of the network and the optimization module 104 can be configured to determine defender, attacker, and/or operator actions that take into account the different priorities in different slices. Slices can be represented by replicating the network topology and using different node attributes for each replicated network topology with the constraint that the total, e.g., data inflow or outflow from a node cannot exceed the node's physical capability. The goal of representing network topology using slices is to establish different "traffic priorities" that can be applied to a single or multiple source/sink node pairs. Traffic priorities can be defined by the penaltyShortfall parameter, which is a per communication unit operating cost penalty for each specific sink node when its demand is not satisfied. For example, if a sink node demand is 5 communication units and penaltyShortfall is 3 operating cost units and that node receives 2 communication units, then the associated operating cost for that node is (5–2)*3=9 units. Higher penaltyShortfall values correspond to higher traffic priorities. The penaltyShortfall parameter is narrow scope, so each node can have a different penaltyShortfall value in each slice.

FIGS. 6A-6K illustrate network resiliency optimization utilizing slices for an exemplary network 600 in four different scenarios—benign (no attack), contested (attacks on one or more arcs) without defense, highly contested without defense, and highly contested with defense. These exemplary scenarios illustrate the impact that data priorities have on data routing and the satisfaction of each sink node's requests, in accordance with one or more embodiments. In this exemplary scenario, the cost to attack any directed arc is one budgetary unit. In this exemplary scenario, the cost to defend any directed arc is one budgetary unit. For simplicity, the per-slice network utilization is shown only for the highly contested scenario. The exemplary network 600 includes 16 nodes 602 and a plurality of arcs 604 representing direct communication links between the nodes 602.

Figure 6A:
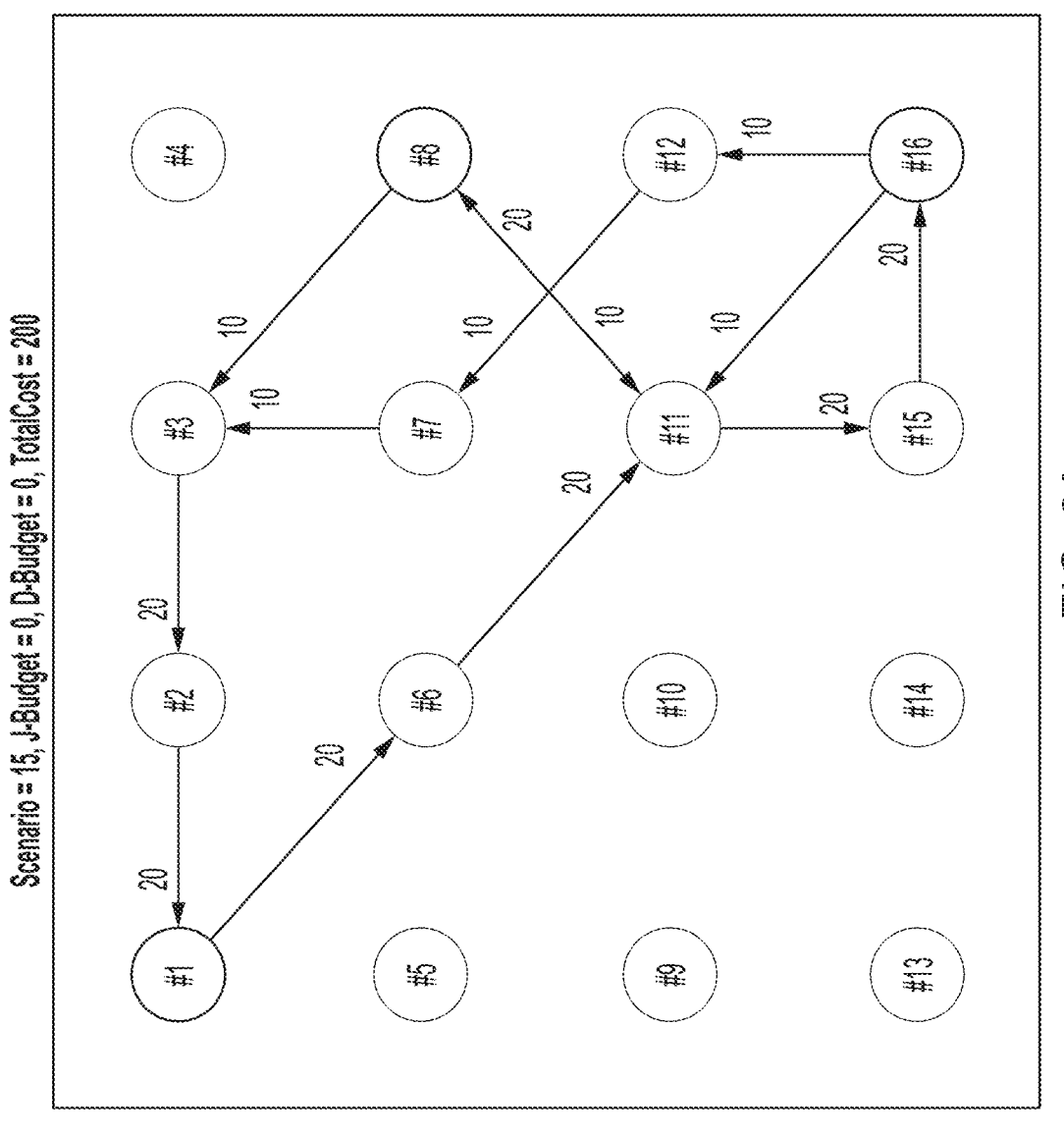

With reference to FIGS. 6A-K, source/sink pairs are configured as follows. In slice 1 (FIG. 6C) and slice 4 (FIG. 6F), node 8 transmits while nodes 1 and 16 receive. In slice 2 (FIG. 6D) and slice 5 (FIG. 6G), node 1 transmits while nodes 8 and 16 receive. In slice 3 (FIG. 6E) and slice 6 (FIG. 6H), node 16 transmits while nodes 1 and 8 receive. In FIG. 6A (which is a representation of the six slices together), attack and defense budgets are set to zero, to establish baseline operating activities. The network is intentionally defined such that no shortfalls are experienced in benign. This network definition is leveraged in the example of FIGS. 6A-6I. Shortfalls are therefore due only to attacks. In this example, each source/sink pair exchanges communication data at two different priority levels. The same two priority levels ("high" and "low") are used. However, this is not limiting. For this example, each sink has a demand of 5 communication units from each source at low priority, and a demand of 5 communication units from each source at high priority. For this example, each sink has a demand, across both priorities, of 10 communication units from each source. For this example, each sink has a total demand, across all priorities and all sources, of 20 communication units.

FIG. 6A illustrates the arc utilization when the exemplary network is not under attack (benign). This view is the total of data flows across all six slices. Each node has a demand of 10 units of high priority data and 10 units of low priority data. Each node receives a total of 20 data units (no shortfall), as expected.

Figure 6B:
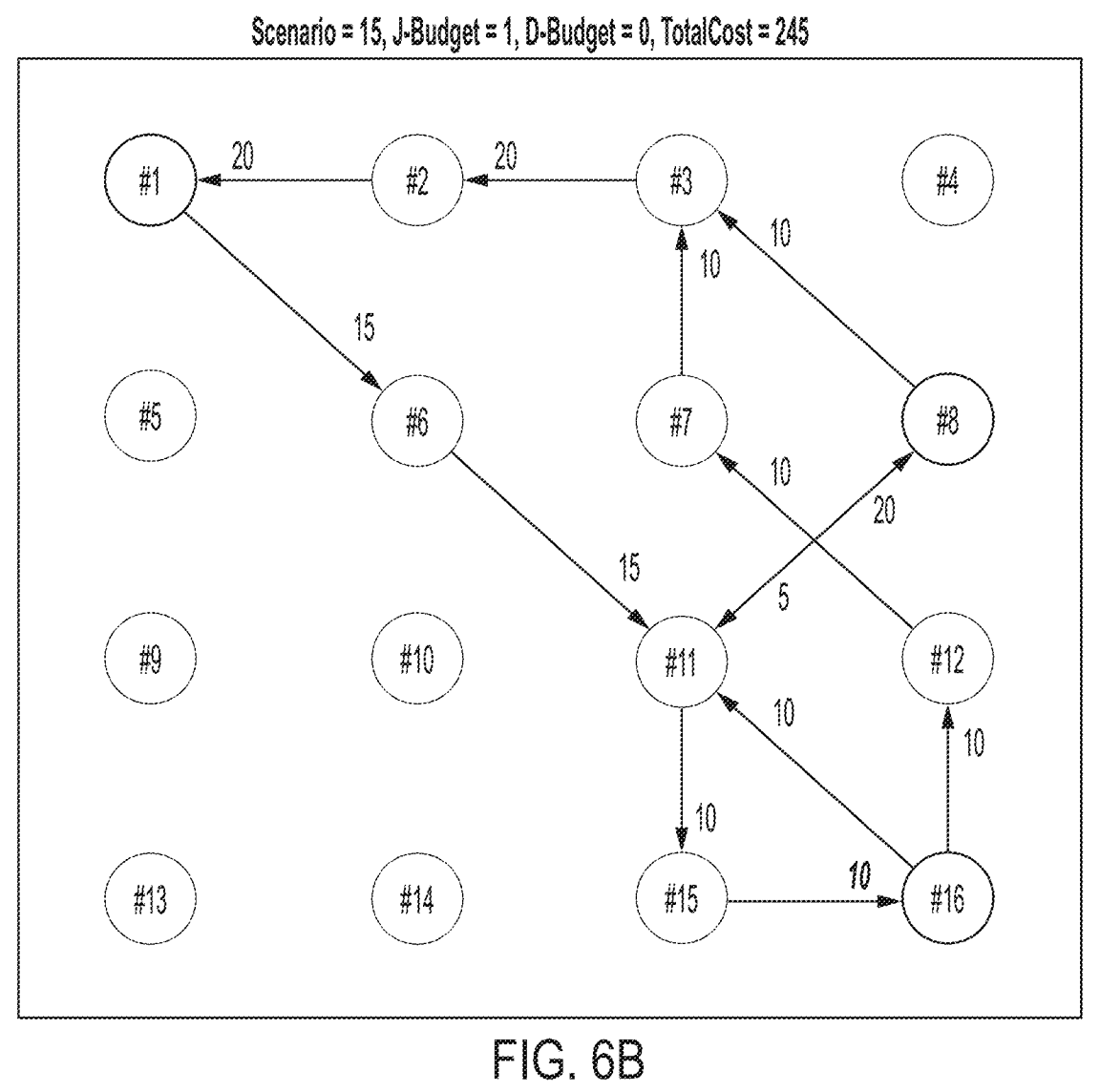

FIG. 6B illustrates the arc utilization when the exemplary network is under attack with an attack budget of 1 unit and no defense budget. In this scenario, the arc between node 15 and node 16 is attacked. An attack on an arc may be assumed to apply to all data traversing the arc, regardless of the slice. In this example, when an arc is attacked, for all arcs, linkCost2Trav=1 (operating cost for one data unit to traverse an arc), and penaltyJam=3 (operating cost for one data unit to traverse an attacked arc, in addition to linkCost2Trav). Thus, when an arc is attacked, the operating cost for each data unit to traverse that arc increases from 1 to 4. Arcs are directed, so the result of an attack is also directed—two attacks are needed to impact an arc in both directions. FIG. 6B shows the total number of data units traversing each arc, which is the sum of data flows across the six slices. Nodes 1, 8 and 16 each have a demand of 10 units of high priority data and 10 units of low priority data. Nodes 1 and 8 each receive a total of 20 data units (no shortfall). Node 16 receives 10 units of high priority data, but does not receive any low priority data. This is not surprising because node 16 has only one ingress arc, and that arc has the same "attack cost" as all other arcs (i.e., it does not have any additional protection).

Figure 6C:
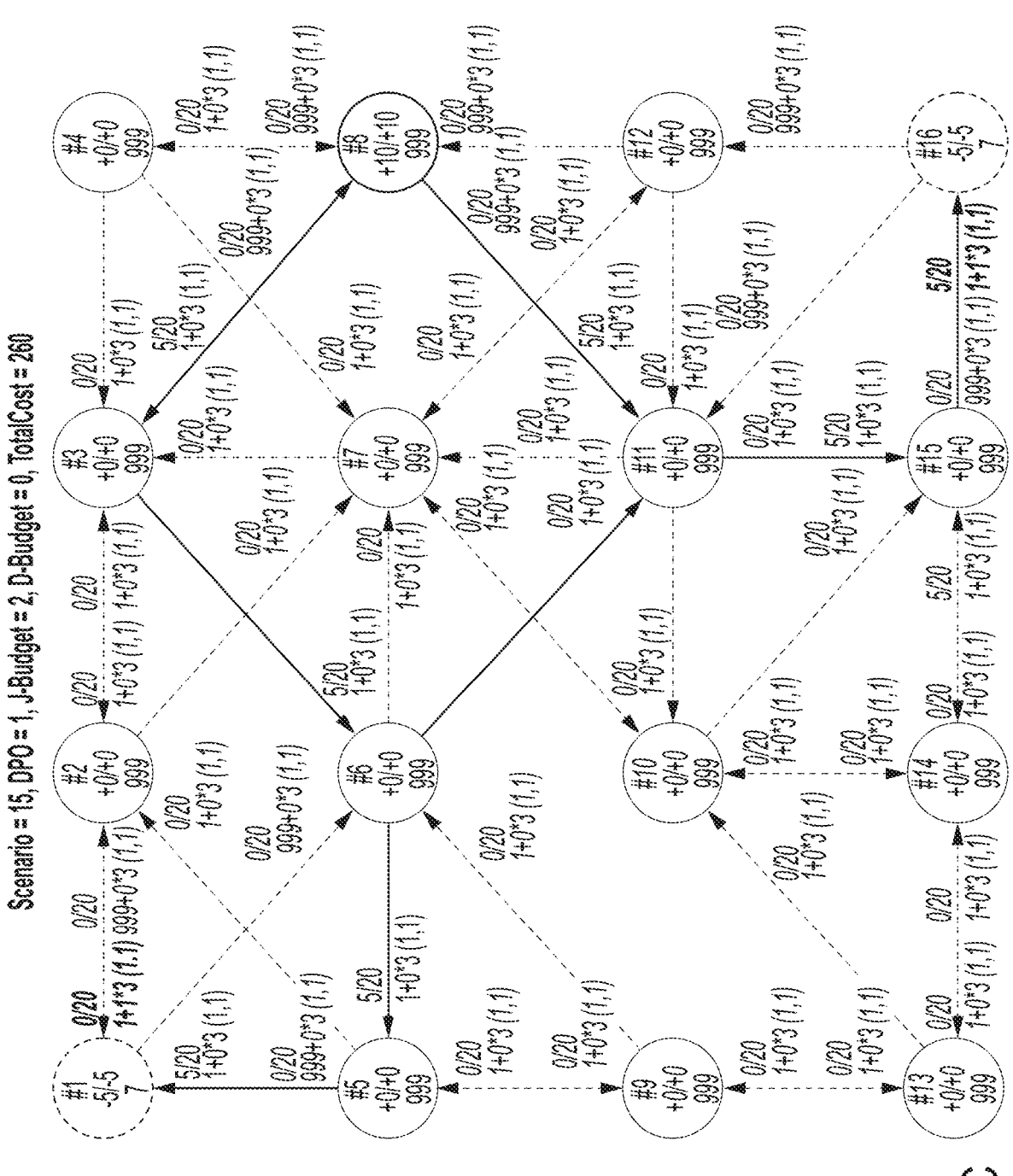

FIGS. 6C-6H illustrate the per slice and aggregate arc utilization for a scenario in which one or more arcs are contested (attacked) with an attack budget of 2 and no defense budget. FIG. 6C illustrates an example of the arc utilization for slice 1. Node 8 transmits while nodes 1 and 16 receive. Both sinks have penaltyShortfall parameter values of 7, which corresponds to high priority. Arcs into nodes 1 and 16 are attacked. No shortfall exists for any node (i.e., all sink node demands are satisfied). Node 1: The least expensive path into node 1 has been attacked (red text), and the lowest cost alternative is to re-route data via a more expensive path instead of forcing node 1 into a shortfall. Node 16: Similar to the contested configuration, the lowest cost option is to use the attacked link into node 16.

Figure 6D:
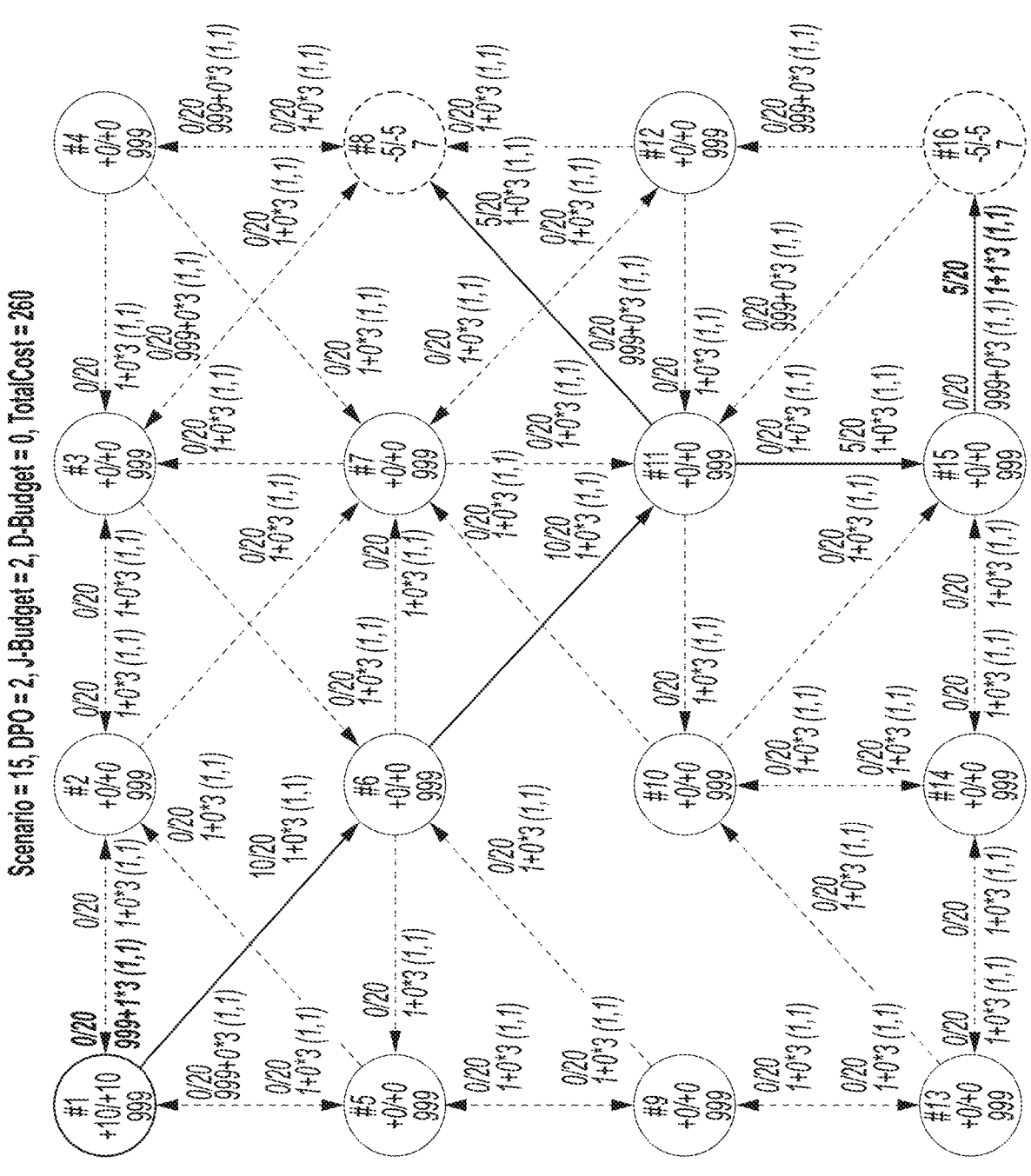

FIG. 6D illustrates the arc utilization for slice 2 under the contested condition of FIG. 6C. Node 1 transmits while nodes 8 and 16 receive. Both sinks have penaltyShortfall parameter values of 7, which corresponds to high priority. No shortfall exists for any node (i.e., all sink node demands are satisfied). Node 8 is not impacted by the attacks. Node 16: Similar to the contested configuration, the lowest cost option is to use the attacked link into node 16.

Figure 6E:
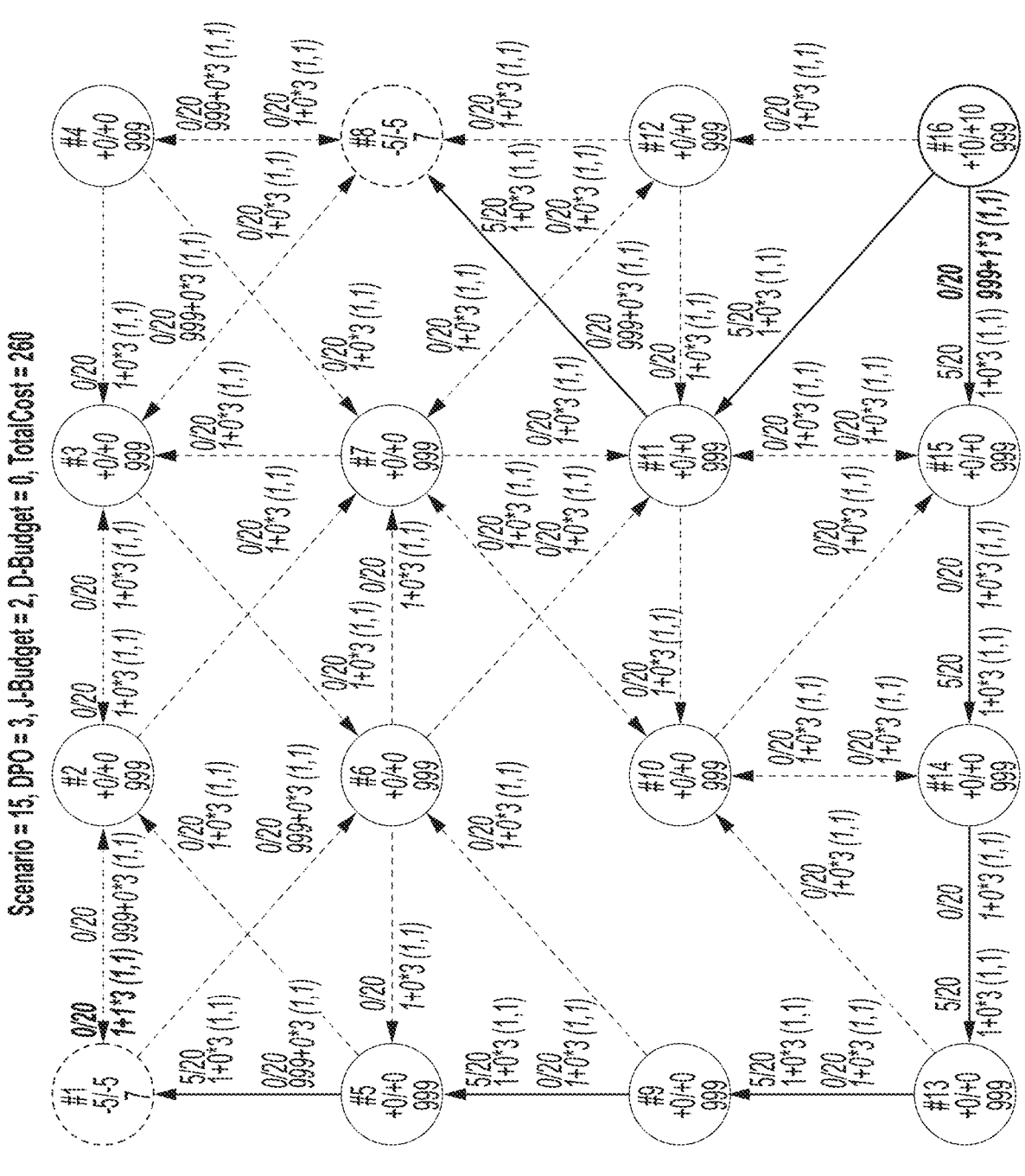

FIG. 6E illustrates the arc utilization for slice 3 under the contested condition of FIG. 6C. Node 16 transmits while nodes 1 and 8 receive. Both sinks have penaltyShortfall parameter values of 7, which corresponds to high priority. No shortfall exists for any node (i.e., all sink node demands are satisfied). Node 1: The least expensive path into node 1 has been attacked (red text), and the lowest cost alternative is to re-route data via a more expensive path instead of forcing node 1 into a shortfall. Node 8: No impact due to attacks.

Figure 6F:
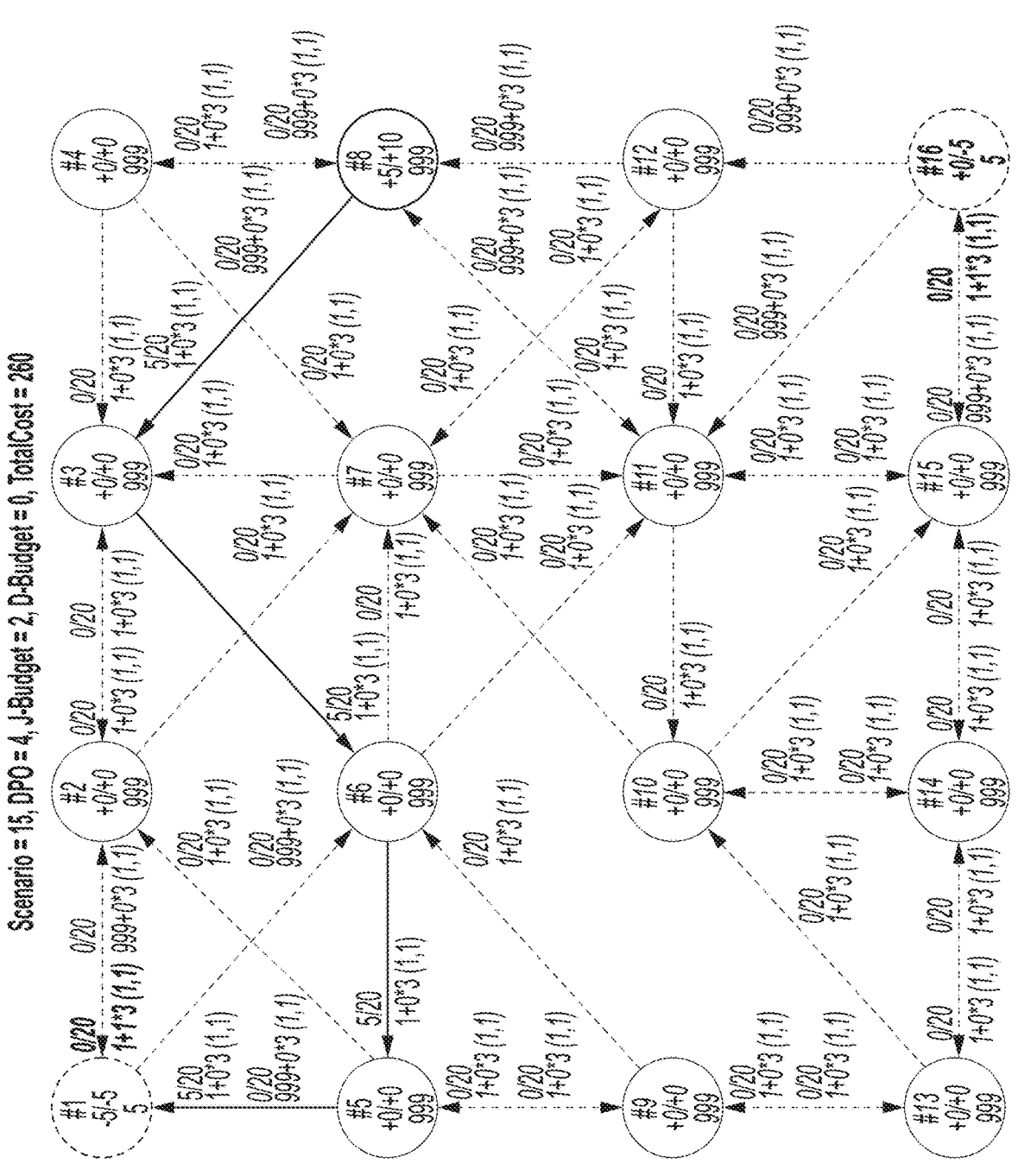

FIG. 6F illustrates the arc utilization for slice 4 under the contested condition of FIG. 6C. Node 8 transmits while nodes 1 and 16 receive. Both sinks have penaltyShortfall parameter values of 5, which corresponds to low priority (5 (low priority) <7 (high priority)). Node 1: Serviced via a more expensive path. Node 16: Receives no data (shortfall).

Figure 6G:
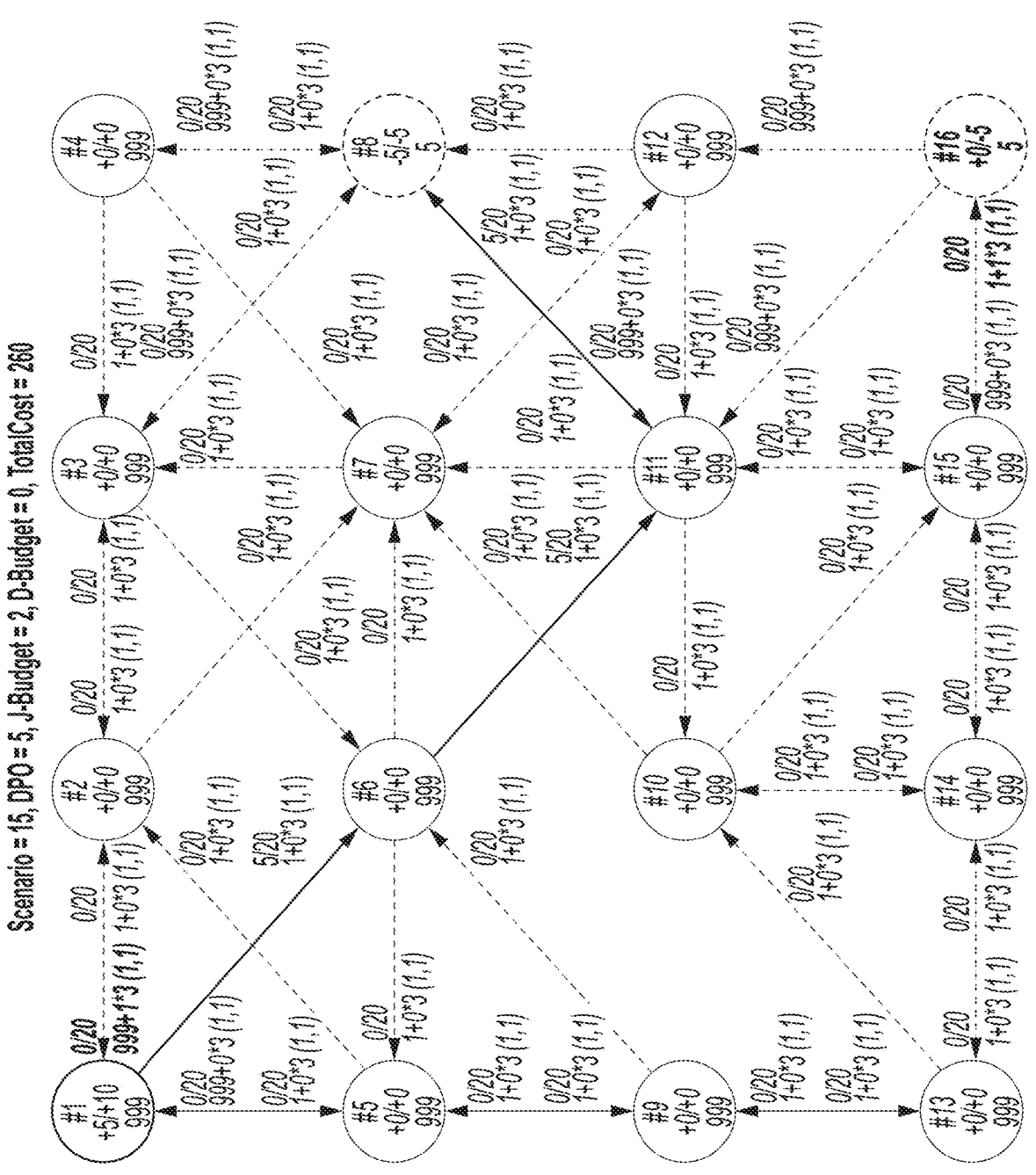

FIG. 6G illustrates the arc utilization for slice 5 under the contested condition of FIG. 6C. Node 1 transmits while nodes 8 and 16 receive. Both sinks have penaltyShortfall parameter values of 5, which corresponds to low priority. Node 8: No impact due to attacks. Node 16: Receives no data (shortfall).

Figure 6H:
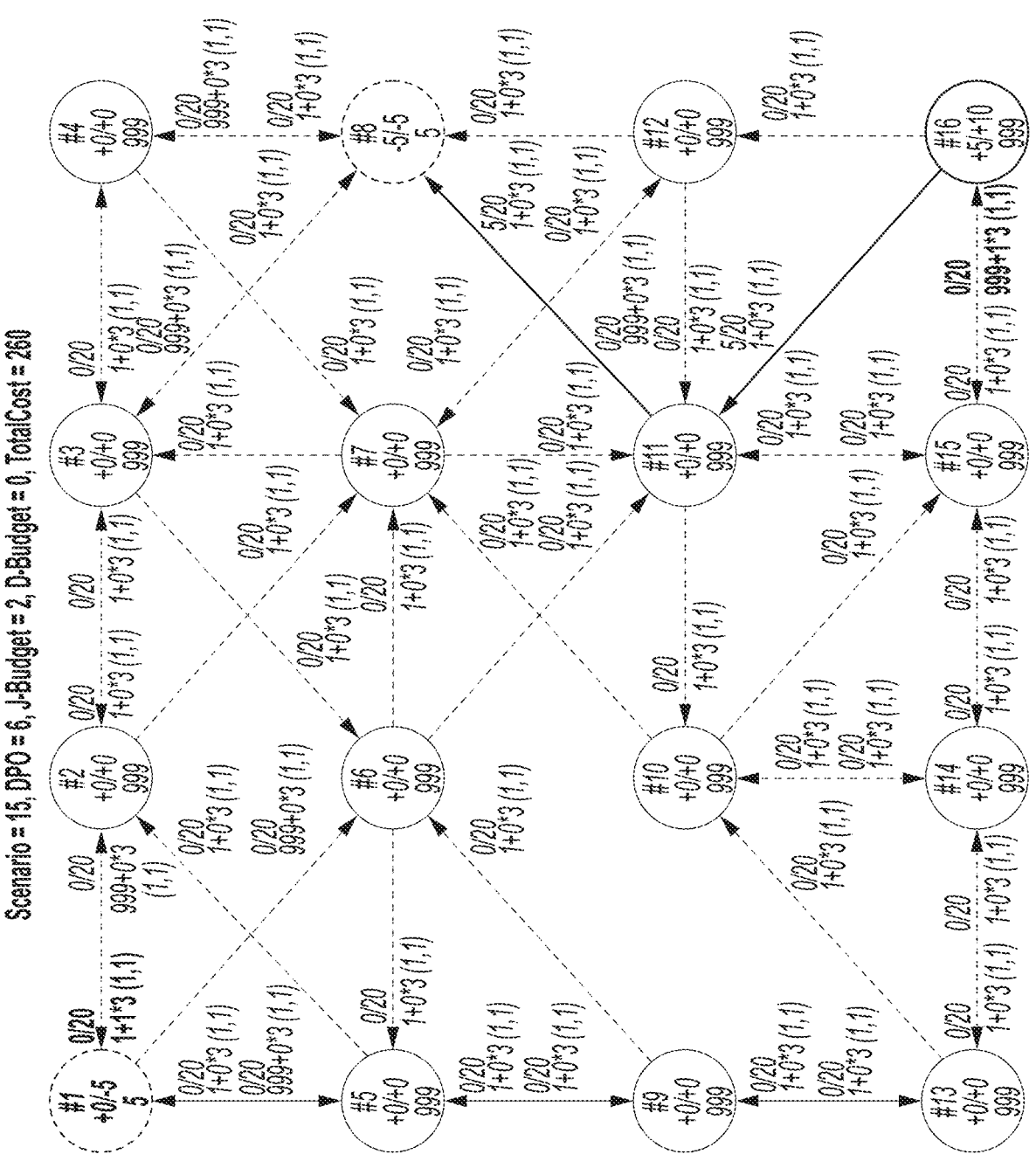

FIG. 6H illustrates the arc utilization for slice 6 under the contested condition of FIG. 6C. Node 16 transmits while nodes 1 and 8 receive. Both sinks have penaltyShortfall parameter values of 5, which corresponds to low priority. Node 1: Receives no data (shortfall). Node 8: No impact due to attacks.

Figure 6I:
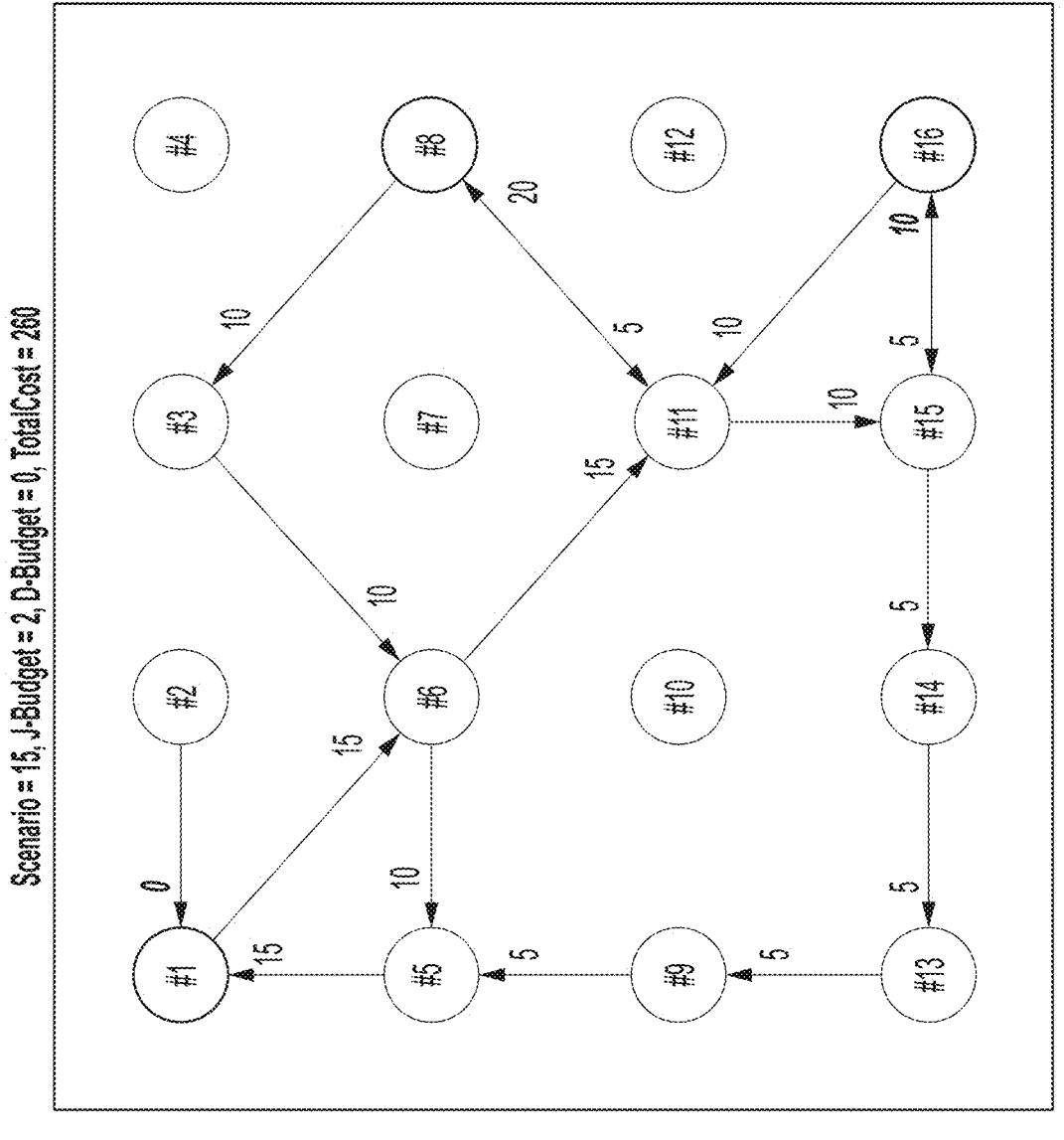

FIG. 6I illustrates the arc utilization summary for the contested scenario of FIGS. 6C-6H. FIG. 6I shows the total number of data units traversing each arc (sum of data flows for Slice 1 through Slice 6). Each node has a demand of 10 units of high priority data and 10 units of low priority data. Node 1 receives 10 units of high priority data, but only receives 5 units of low priority data. Node 8 receives a total of 20 data units (no shortfall). Node 16 receives 10 data units of high priority data, but does not receive any low priority data.

Figure 6J:
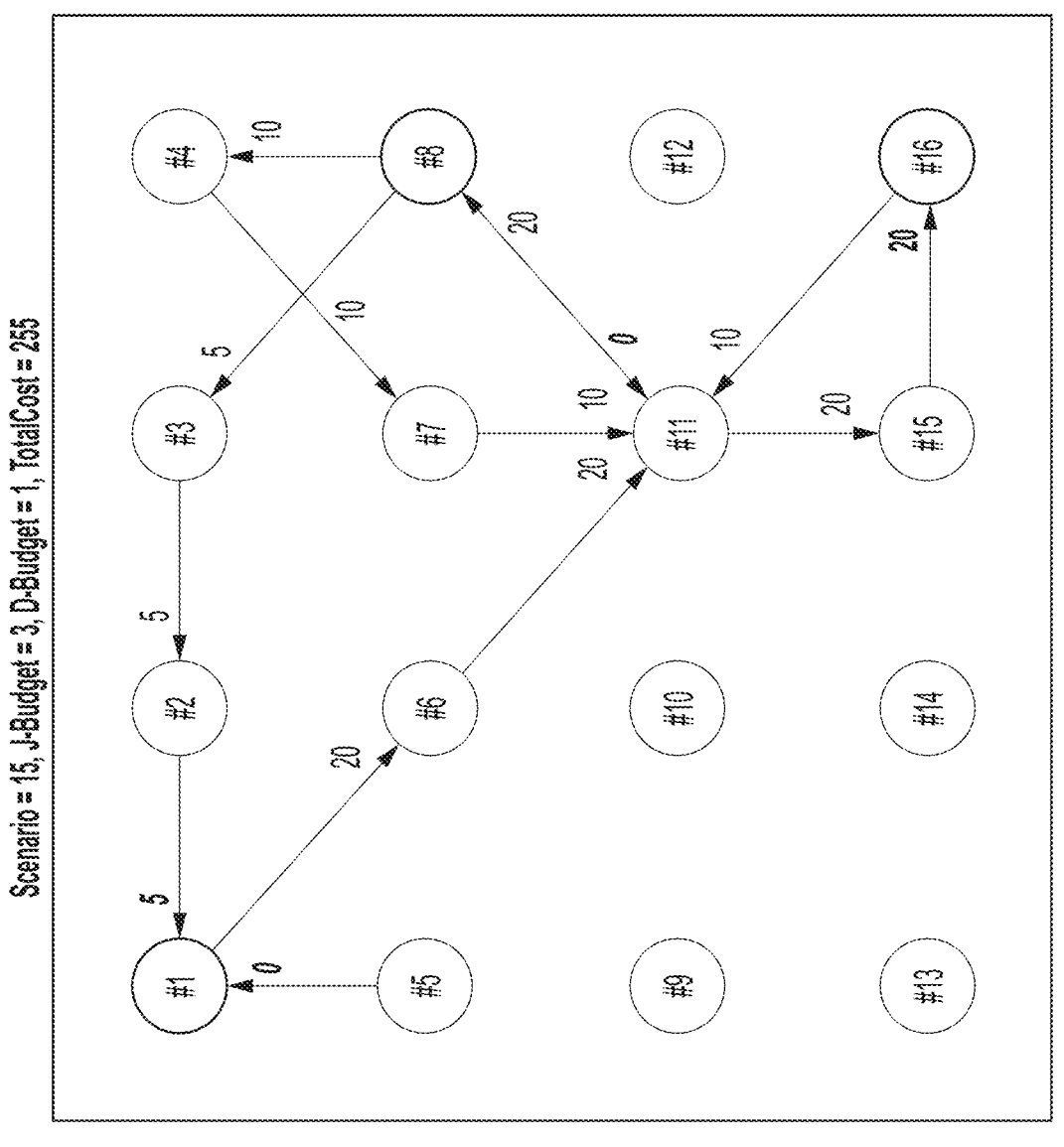

FIG. 6J illustrates the arc utilization (sum of all slices) for an exemplary scenario in which one or more arcs are contested (attacked) with an attack budget of 3 units and an arc is defended with a defense budget of 1 unit. In this example, the effect of defending an arc is that it cannot be attacked. Since arcs are directed, the result of a defense may also be directed such that two defenses are needed to protect an arc in both directions. The arc from node 15 to node 16 is defended (green text). Each node has a demand of 10 units of high priority data and 10 units of low priority data. Node 1 receives 5 units of high priority data, but does not receive any low priority data. Nodes 8 and 16 each receive a total of 20 data units (no shortfall). FIG. 6J is an example of low-level outputs that may be provided by optimization module 104, which include arc utilization (FIG. 6J shows the sum of data across all priority levels), a list of defended arcs (the arc from #15 to #16), and a list of attacked arcs (the arc from #5 to #1, from #2 to #1, and from #8 to #11).

FIG. 6K is a chart summarizing the communication data flow for the four scenarios described above. The total operating cost for: the benign scenario (0 Attacks and 0 Defense) is 200; the contested scenario (1 Attack and 0 Defense) is 245; for the highly contested scenario (2 Attacks and 0 Defense) is 260; and for the contested and defended scenario (3 Attacks and 1 Defense) is 255. Note that for any given sink node, low priority data is always sacrificed before any high priority data is reduced. However, across a single configuration, high priority data may be reduced prior to sacrificing all low priority data. Thus, by representing different priority communication demands in different logical subnets, lower-priority data can be sacrificed before any higher-priority data is reduced (i.e., the single global mathematical optimization honors the data priorities requested by each sink node per slice).

The optimization module 104 may be configured such that a given sink node's data requests associated with multiple source nodes may exist in one logical subnet, in which case any source node may fully or partially satisfy the sink node's request (i.e., fungible data). Additionally or alternatively, a given sink node's data requests may also be assigned such that each request to a different source node exists in a different subnet, in which case there is a one-to-one correspondence between the request and the specific source node that must satisfy the request (i.e., non-fungible data).

The optimization module 104 may be configured such that logical subnets may be used to manage which resources are available to different network users. The logical capacity of an arc in a subnet associated with one user may be set to zero to completely prevent that user from using that arc, while other users may be allowed to use that arc in other subnets. Some resources (e.g., specific satellite links) may be reserved for exclusive use by a specific user while other resources (e.g., fiber optic backbone) may be available and encouraged for use by all users.

The optimization module 104 may be configured such that the single global mathematical optimization may account for the cost of routing data and the cost of unsatisfied sink node demand across all subnets in the network. Where subnets have overlapping resources, the single global mathematical optimization may provide outputs that account for the shared nature of those resources. Resource attributes may be automatically adjusted so that source/sink pairs separated by long distances (i.e., large traversal cost) are not penalized compared to source/sink pairs separate by shorter distances (i.e., small traversal cost).

The optimization module 104 may be configured to employ distributed processing features that reduce the execution time of large graphs, for example up to 20,000 nodes or higher. The optimization itself may employ a combination of techniques, including but not limited to linear programs, mixed integer programs, swarm intelligence, genetic algorithms, simulated annealing, and artificial neural networks (which are examples of low-level optimization algorithms that may be executed by the optimization module 104).

Figure 7:
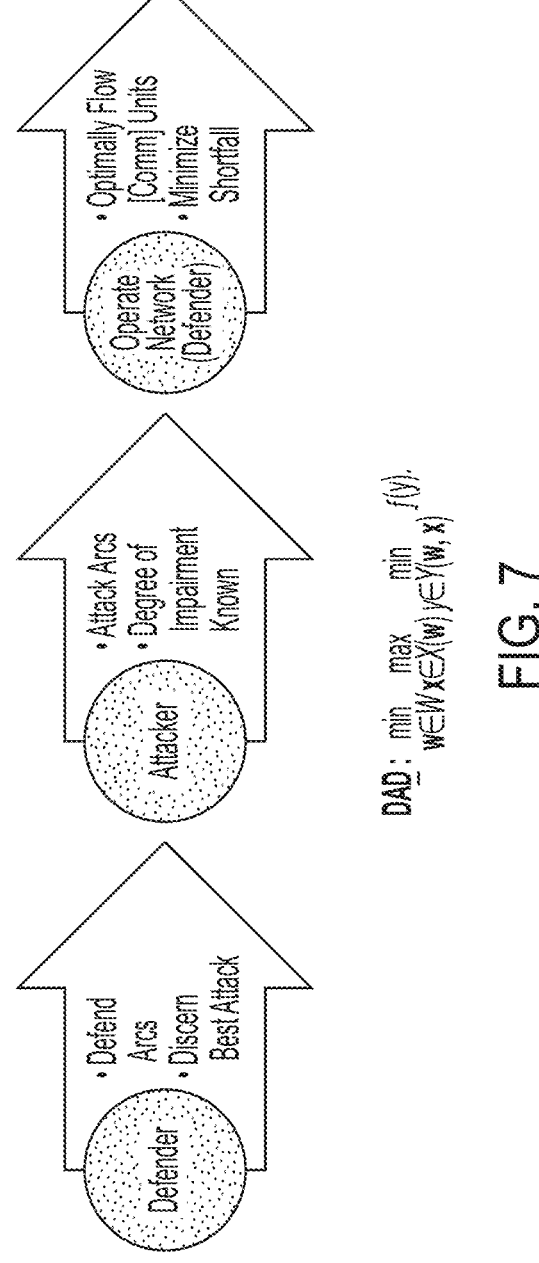
FIG. 7 and FIG. 8 illustrate an exemplary formulation of a problem to be solved for determining network resiliency.
Figure 8:
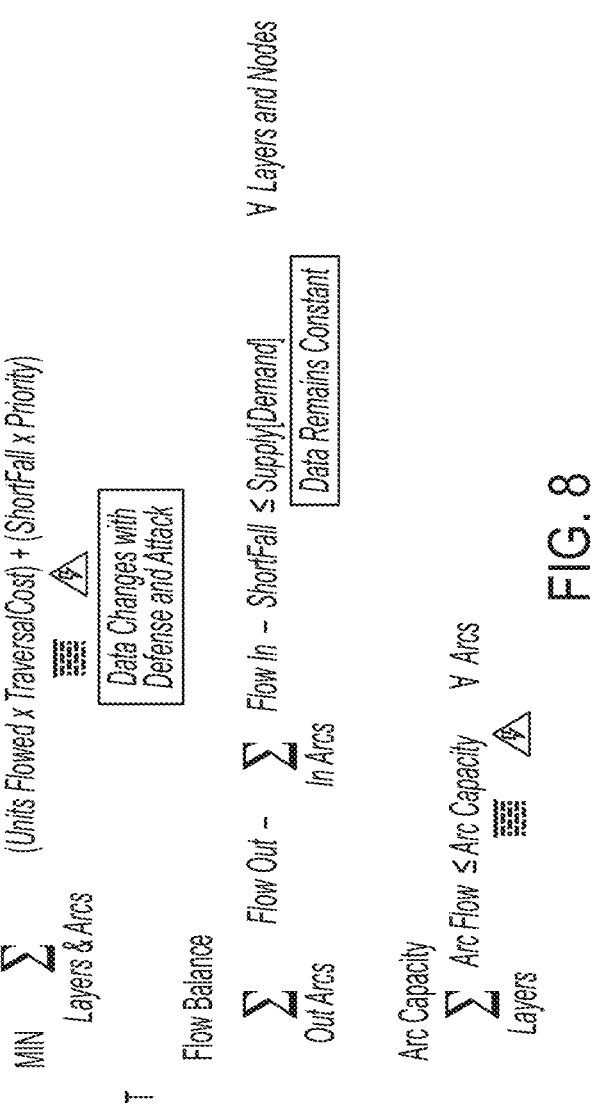

FIG. 7 and FIG. 8 describe the formulation of the problem to be solved (called Defender Attacker Defender, or DAD, in the figures) by the optimization module 104, in accordance with one or more embodiments. The optimization solution may be achieved via multiple coordinated control loops that invoke mixed integer programs in series, in accordance with one or more embodiments. Alternatively, an optimization solution can be achieved via evolutionary methods such as particle swarm optimizations that invoke linear programs in parallel, in accordance with one or more embodiments. The mathematical optimization may employ warm-start techniques that allow for faster execution when the current graph has similarities to prior graphs and/or is a variation of the prior graph, which may occur when a single network topology evolves over time in response to outages/failures, attacks, defenses, or changes in sink node demands for data.

With reference to FIG. 8, the first equation is an objective function, whereby the optimal communication data flow is determined by minimizing the sum across all layers and arcs of the costs to traverse arcs and the costs associated with exceeding source maximum transmission limits and/or not meeting sink demands. The second equation is a flow constraint. The third equation ensures that arc flow does not exceed arc capacity. The arc capacity term can be configured to implement arc capacity changes when arcs are attacked and/or defended. For example, the arc capacity term can be, for arc ij:

$$Y_{ij} \leq u_{ij} - t_{ij}\hat{x}_{ij}(1-\hat{w}_{ij}) - v_{ij}\hat{x}_{ij}\hat{w}_{ij}$$

where $Y_{ij}$ is the arc flow for arc ij, $t_{ij}$ is the capacity reduction if an arc is attacked and not defended, $v_{ij}$ is the capacity reduction if an arc is both attacked and defended, $x_{ij}$ is equal to 1 when arc ij is attacked (zero when not) and w is equal to 1 when the arc is defended (zero when not).

The management module 102 may configure the optimization module 104 to support time-based functionality, which may be implemented by constraining the arc capacity for each arc (in the mathematical optimization, not in the actual network) to the current flow for that arc (see FIG. 8), and then incrementally increasing each arc's capacity constraint during every iteration of the mathematical optimization until each arc's capacity constraint equals the maximum physical capacity for the corresponding real-world arc.

Figure 9:
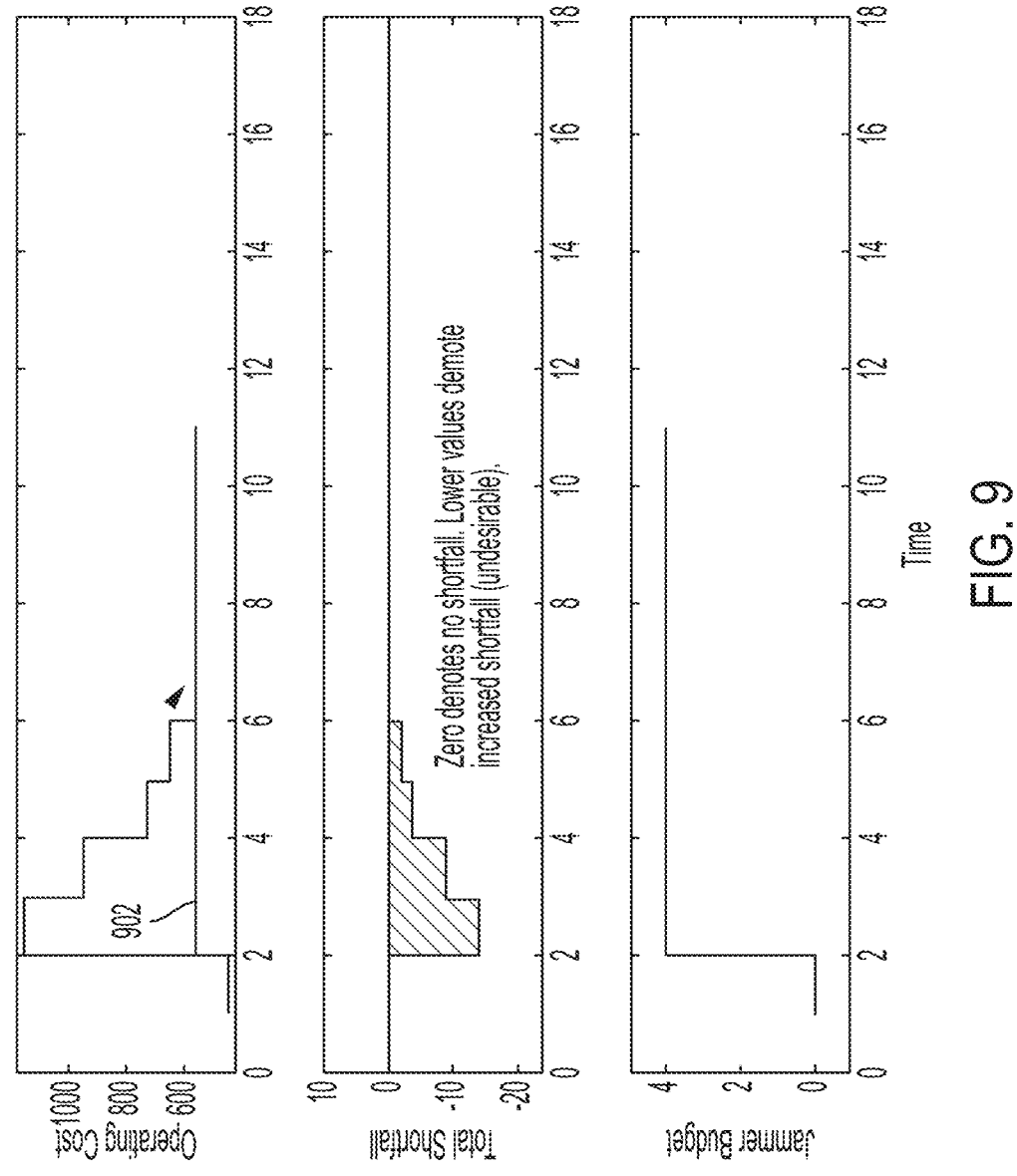
FIG. 9 illustrates an exemplary way in which time-based functionality can be used to simulate a gradual network response to the sudden onset of an attack.

FIG. 9 illustrates an exemplary way in which time-based functionality can be used to simulate a gradual network response to the sudden onset of an attack, in accordance with one or more embodiments. When the system 100 is configured in this way, the optimization module 104 may provide results that are less optimal in exchange for increased routing stability over time (i.e., avoid "flapping"). This is a real-world compromise that may benefit the user. This feature may be particularly useful in the presence of partial-time attacks (i.e., the repeated sudden onset of attacks), or when network status information is corrupt for a short period of time (i.e., the status information does not correctly represent the actual current network state, so this feature avoids unnecessary network routing disruption if the mathematical optimization responds with a time constant that is larger than the short-lived erroneous status information).

Time-based functionality may include taking information from a prior DAD run and using it to manipulate the capacities of the various arcs. The total flow through an arc for a current DAD iteration is limited to a predefined delta from the total flow through the arc for a previous DAD iteration. This allows the data in an arc to increase incrementally over time, not all at once, which can prevent oscillation. In contrast, there may be no limit on how quickly an arc's capacity may reduce since physical systems may see immediate capacity reduction.

FIG. 9 includes three charts illustrating the response of optimization module 104 to an attack of attack budget 4 that occurs at time increment 2. The top chart shows the operating cost for each time increment. The bottom chart shows the attack budget. The middle chart shows the total shortfall across all nodes. As illustrated by the gradual reduction in operating cost over time in the top chart, the optimization module 104 responds slowly to the change in attack, taking its time in reducing the operating cost to the minimum operating cost shown by line 902 (which corresponds to a total shortfall of 0 in the depicted example). This gradual response can reflect an intentional decision by the optimization module 104 to not abruptly provide a large configuration change to the network, which may provide a better response to "pulsed" or intermittent attacks. The optimization module 104 may implement this gradual response by gradually raising the maximum capacity constraint on an arc-by-arc basis (constrained by the maximum physical capacity of the arc or the reduced capability capacity resulting from attack).

The management module 102 may support a planning mode that is not intended for real-time use. For example, the planning mode may support PACE (primary, alternate, contingency, and emergency) planning efforts that establish pre-defined configurations to be invoked as necessary when dictated by future conditions. The various levels within the PACE plan may be represented by different attack budgets (from the primary configuration that has no attack budget to the emergency condition that has the largest attack budget).

Figure 10A:
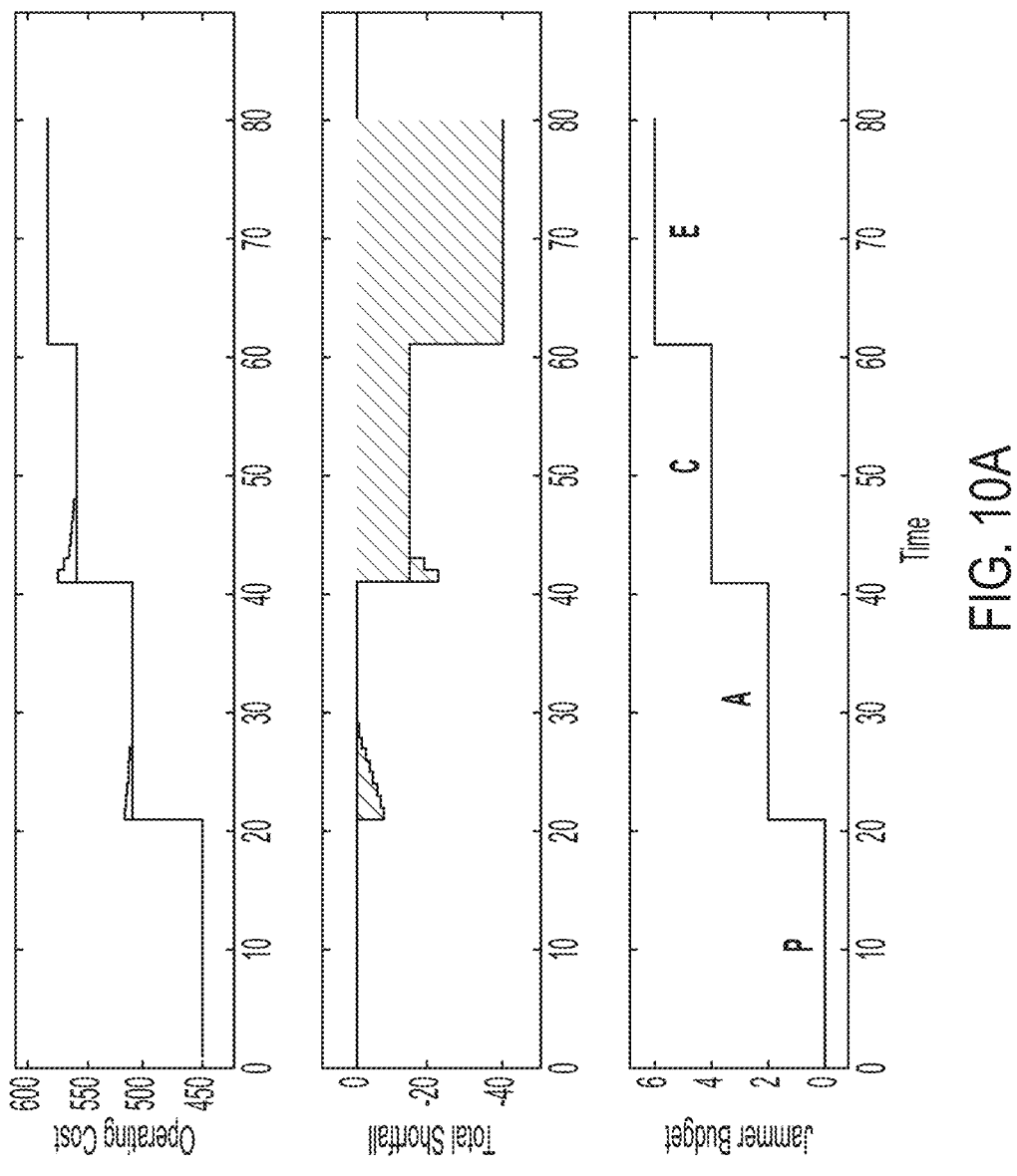
FIGS. 10A-10D depict two different PACE (primary, alternate, contingency, and emergency) plan examples for a single exemplary network topology.
Figure 10B:
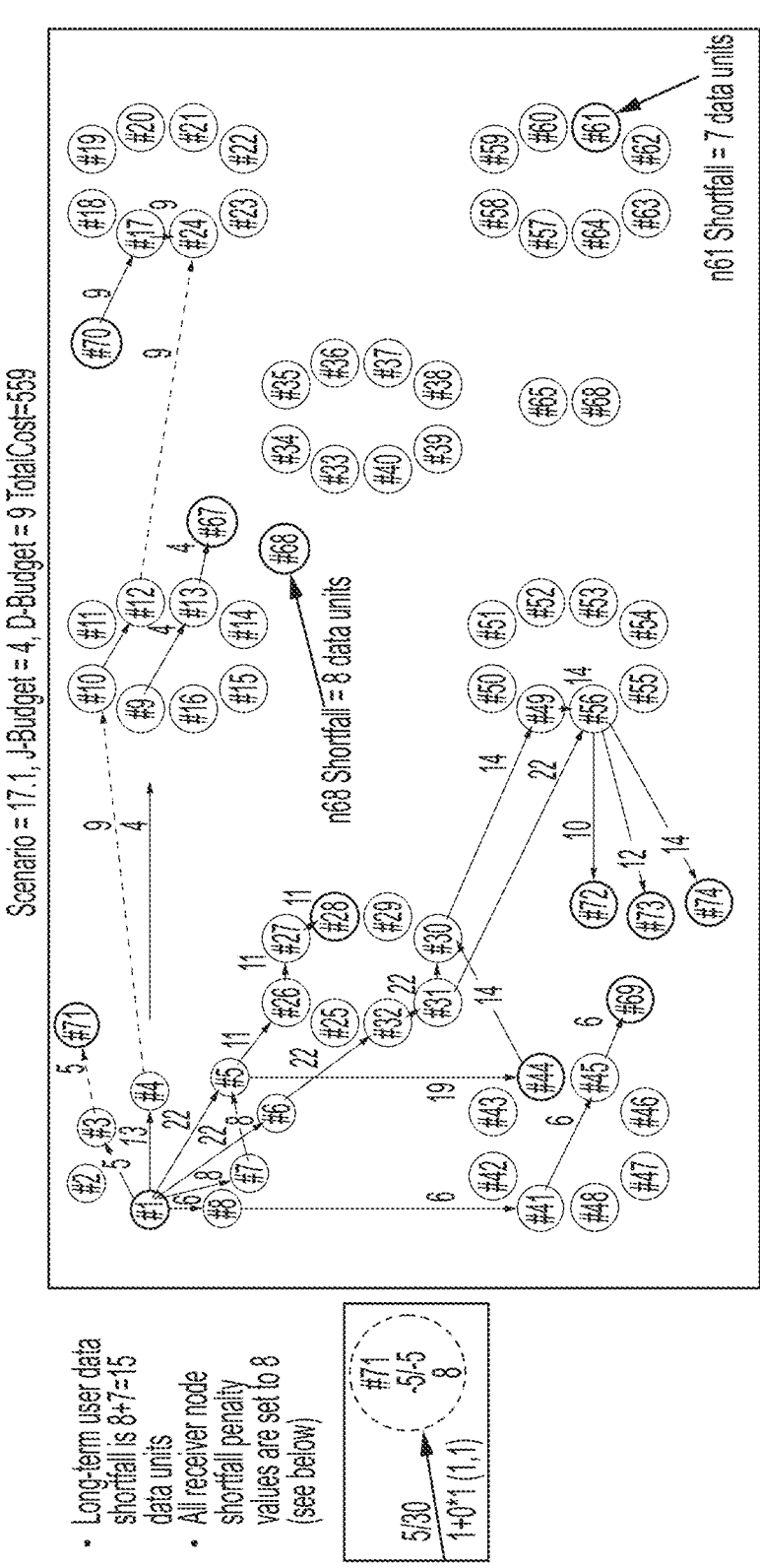

FIGS. 10A-D depict two different PACE plan examples for a single exemplary network topology, in accordance with one or more embodiments. FIG. 10A shows an overview of PACE example 1, in which the highest importance is placed on routing efficiency (receiver node shortfall penalty values are set to 8). In this example, the primary phase corresponds to an attack budget of 0 and has no shortfall. The alternate phase corresponds to an attack budget of 2 and no long-term shortfall (there may a short-term shortfall when transitioning from the primary configuration as the optimization module 104 purposefully responds gradually to the change in attack budget). The contingency phase corresponds to an attack budge of 4 and a long-term data shortfall of 15 data units. FIG. 10B shows the recommended data routing while in the Contingency phase of the PACE plan for example 1. The emergency configuration phase to an attack budget of 6 and long-term data shortfall of 41 data units.

Figure 10C:
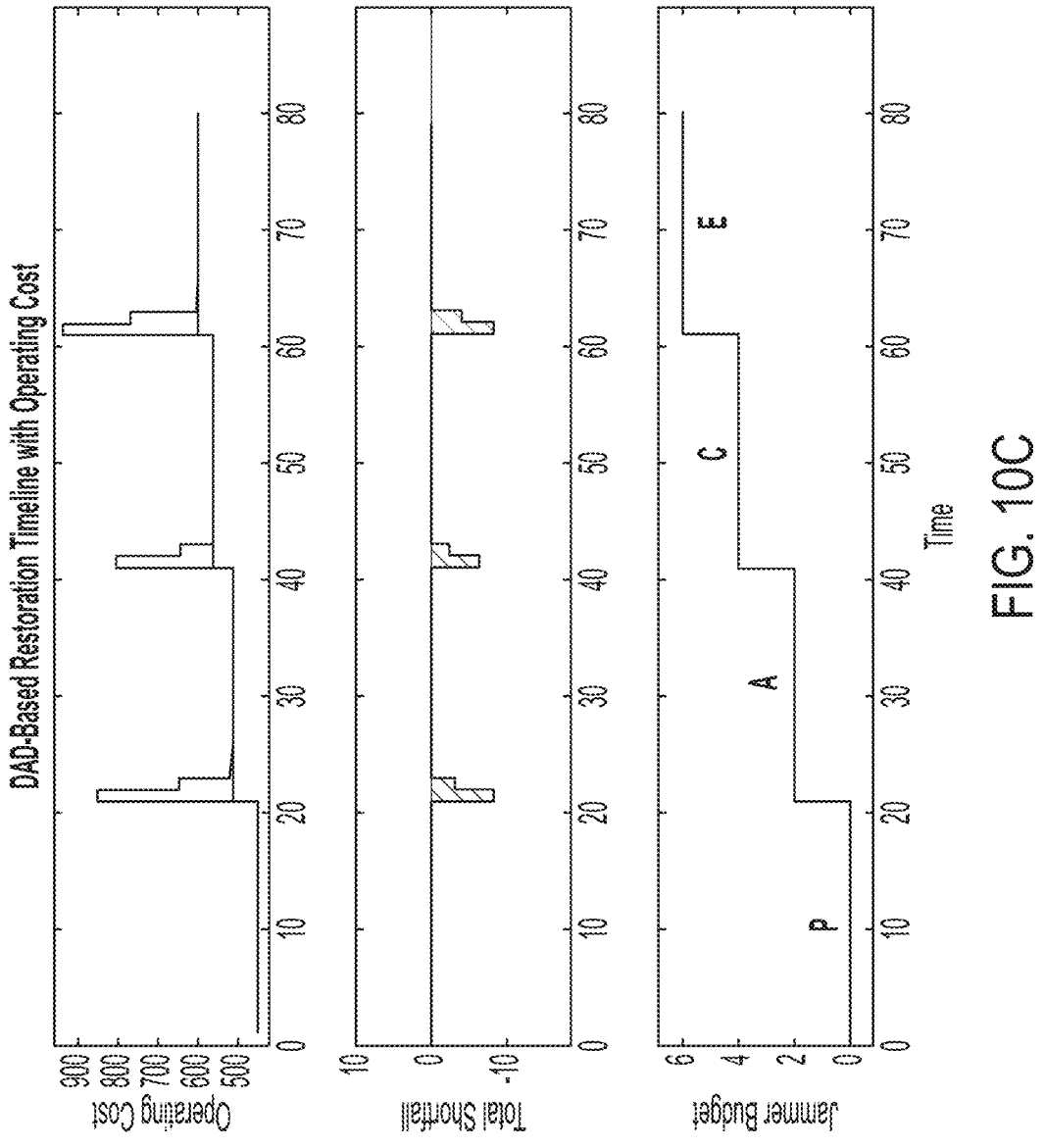
Figure 10D:
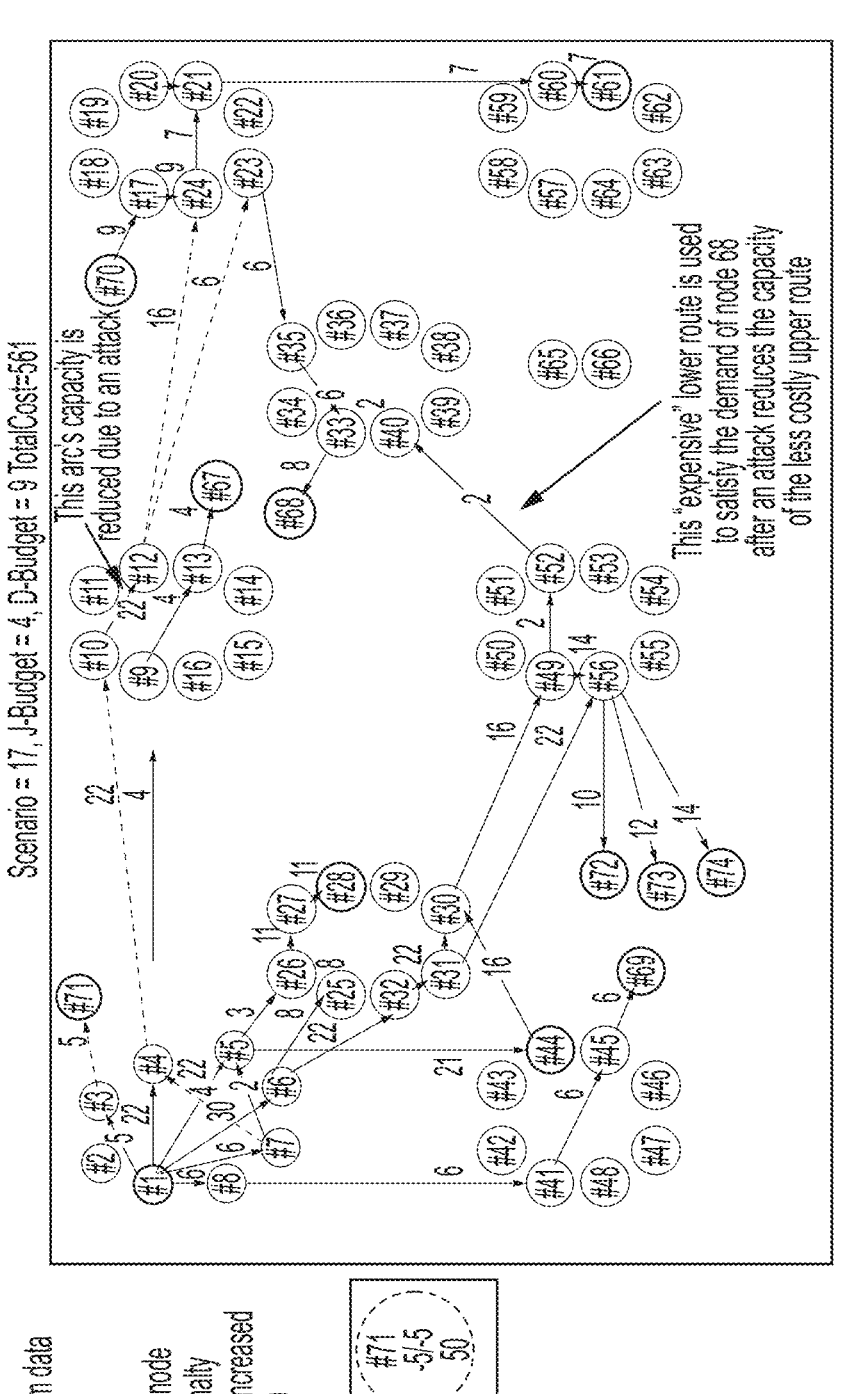

FIG. 10C shows an overview of PACE example 2 (for the same exemplary network used for PACE example 1), in which the highest importance is placed on minimum shortfall (receiver node shortfall penalty values are raised from 8 to 50, corresponding to higher data priority with respect to the cost of routing data across the network). Because a priority is placed on minimum shortfall, no users experience sustained data shortfalls. The different behaviors of example 1 and example 2 illustrate one way that an operator can modify a shortfall penalty value to influence the optimization results provided by optimization module 104—e.g., an operator can trade-off between operating cost and satisfaction of user demand. FIG. 10D shows the recommended data routing while in the Contingency phase of the PACE plan for example 2 (long-term data shortfalls are not experienced), which can be contrasted with the routing recommendation for the Contingency phase of example 1 (long-term data shortfalls are experienced). Recommended data routings while in the Primary, Alternate and Emergency phases are not shown. While in planning mode, the model may only recommend what activities a hypothetical attacker would perform (there is no actual physical attack during planning).

The management module 102 may support "what if" scenarios to be explored via planning mode. This may include the ability to trade between different network slicing configurations to identify the most resilient slicing configuration while under attack. Planning mode results may be prescriptive, but the user may need to wait for an extended period of time to obtain the results. As such, it may be appropriate to conduct planning activities well in advance of their intended use.

While in planning mode, the management module 102 may support a configuration where attacks are cumulative, in which case an attacked arc (with increased data traversal cost and reduced capacity) may be attacked repeatedly causing further increases to data traversal cost and reductions in capacity.

While in planning mode, management module 102 may support a configuration where partial defenses are possible, in which case each defense of an arc incrementally increases the cost to attack that arc and/or incrementally mitigates the traversal cost increase due to attack and/or incrementally mitigates the capacity reduction due to attack. The optimization module 104 may account for the diminishing returns of repeatedly defending a particular arc, and the near-optimal result may recommend a relative distribution of defensive resources to be spent across various arcs (i.e., spend more defensive budget on one arc compared to the defensive budget spent on another arc).

While in planning mode and when provided with a minimal graph description that does not contain all information necessary to run the mathematical optimization, the management module 102 may support the ability to populate representative resource characteristics such that the mathematical optimization may be employed. This ability may be combined with Monte Carlo methods to obtain overall graph resiliency properties that are not tied to any particular set of resource characteristics.

Figure 11:
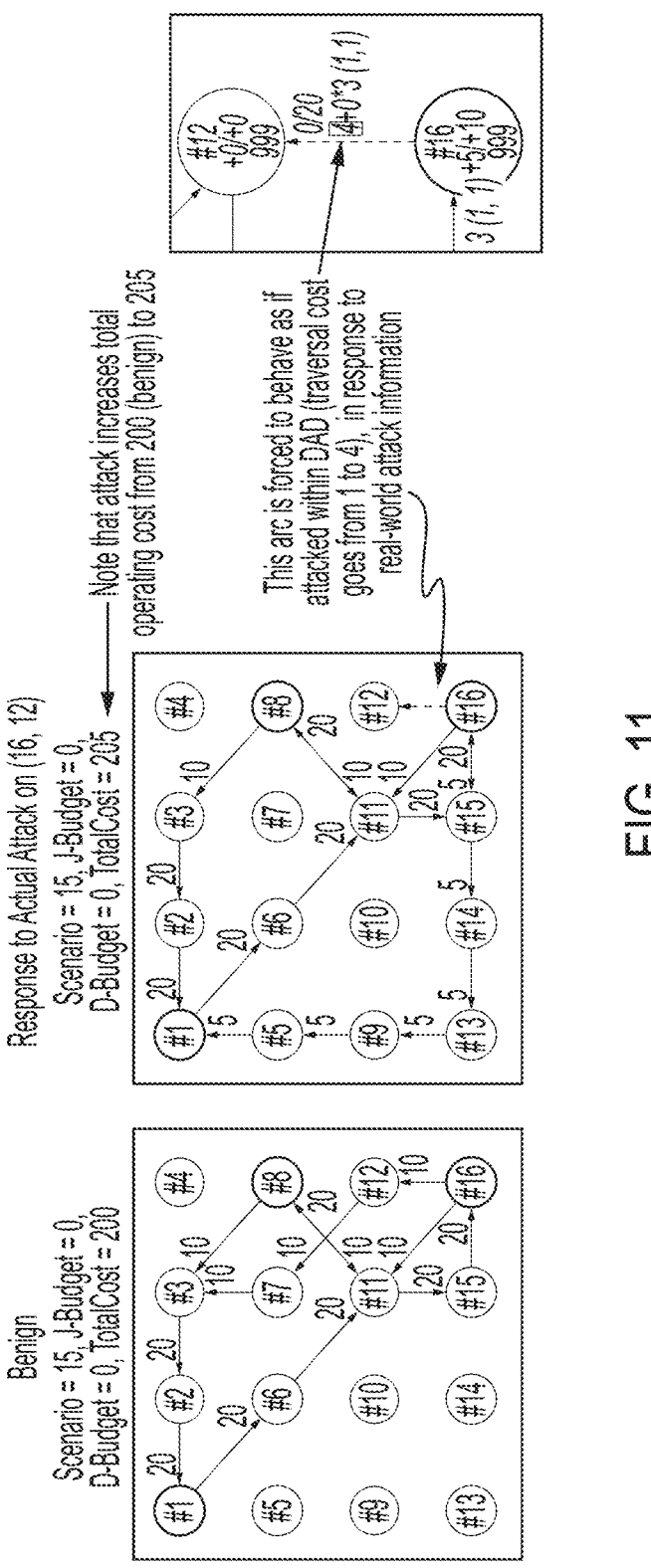
FIG. 11 depicts an operational mode example in which data routing recommendations account for status information indicating that a specific arc has been attacked.

The management module 102 may support an operational mode that is intended for real-time use based on real-time status information provided by the network of interest. For example, the operational mode may support the real-time creation of data routing commands in response to the onset, change, or termination of an actual attack. The result of an actual attack is an elevated cost to route data across the attacked arc, and possibly a reduction in the capacity for that arc. FIG. 11 depicts an operational mode example in which data routing recommendations account for status information indicating that a specific arc has been attacked, in accordance with one or more embodiments. Operational mode results may only be able to respond to actual attacks (not prevent or preemptively mitigate them), but the user may not need to wait as long to obtain the results compared to the planning mode. The management module 102 may support the ability to automatically terminate an in-progress optimization if the results are within a user-selectable optimality gap. The management module 102 may support the ability to terminate an in-progress optimization and generate "best effort" results based on a user-generated interrupt if the user cannot wait longer for results to be generated.

While in operational mode, management module 102 may convert mathematical optimization results into network configuration commands including but not limited to recommended data routing paths. The commands may influence actual network operation that subsequently cause updated network status information to be received by management module 102, creating a resiliency control loop.

While in either planning or operational modes, the management module 102 may generate a set of near-optimal solutions (within a certain optimality gap) for consideration and selection by the user, as further described in the human interface component description.

The management module 102 may support the ability to emulate an attack or defense of a node via corresponding attribute changes to the arcs associated with that node. An attack may be emulated by manipulating the input parameters to the optimization module 104, specifically by increasing the traversal cost of an arc and possibly in addition by decreasing the maximum capacity of that arc. A defense may be emulated by manipulating the input parameters to the optimization module 104, specifically by increasing the cost to attack an arc (a cost-based interdiction that prevents an attack). By extension, the management function may support the ability to combine a set of nodes into a single super-node to allow for faster execution of the mathematical optimization at the expense of model fidelity.

The management module 102 may support the automated ability to react to network fragmentation in which a single large network is split into multiple smaller disjoint networks. A single network may need one instantiation of the management module 102. If a single network is split into two smaller disjoint networks, then each of those two smaller networks may need one instantiation of the management module 102 (for a total of two instantiations of the management module 102). The first smaller network may naturally inherit the management module 102 instantiation from the original single larger network, and this management module 102 may learn that its graph has been truncated. The second smaller network may not initially have a management module 102 instantiation, so a devolution process may be employed to instantiate a new management module 102 for the second smaller network. Similarly, a process may be employed to combine management module 102 instantiations (aggregating information possessed by the smaller networks) if previously disjoint smaller networks combine to form a larger network.

The management module 102 may support an interface to the network of interest that is tailored to that specific network of interest. Other interfaces between the management module 102, optimization module 104, and user interface module 106 may be standardized and not subject to tailoring based on the specific network of interest. For embodiments in which the tailored network interface does not contain parameters that align precisely with the standardized interfaces used elsewhere in the model, the management module 102 may support a translation layer between the tailored interface and the standardized interfaces. For example, the translation layer may convert actual network parameters including but not limited to time jitter, latency, and queue depth into more generic standardized interface parameters such as the traversal cost of data across an arc.

The management module 102 may exchange information with other low-level functions within the network of interest. The optimization modules 104 described above may implement abstracted (lower fidelity) approaches that can take a long time to execute, so the management module 102 may also interface with additional complementary sources of information. For example, the management module 102 may interface with waveform-centric algorithms that are highly tailored to, and perhaps embedded within, specific network resources. These waveform-centric algorithms may provide higher fidelity information with faster update rates.

The management module 102 may accept tailored information from waveform-centric algorithms, translate that information into standardized parameters, and then provide those parameter values to the mathematical optimization. For example, a waveform-centric algorithm may generate an accurate real-time assessment of the robustness of a communication link, the management module 102 may translate that information into a more generic standardized interface parameter such as the cost to attack the corresponding arc in the graph, and that parameter may be provided as an updated input to the mathematical optimization.

FIG. 12 is a flow diagram of an exemplary method 1200 for increasing communication network resiliency using a prescriptive network resiliency model configured to determine optimal communication data routing through the network, identify network weakness that may be exploited by one or more adversaries, and/or identify ways to defend the network to maximize resiliency. Method 1200 can be performed by system 100 of FIG. 1 and can be used for optimization of data routing of any network configuration.

At step 1202, a model is defined that represents a communication network. The model can be defined in part by formulating a directed graph that includes nodes that represent communication data sources, nodes that represent communication data sinks, and nodes that represent communication data routers, such as discussed above with respect to simplified example network topology 500 of FIG. 5A. The model can be defined by defining a plurality of layers (also referred to herein as slices), such as described above with respect to FIG. 2A and FIGS. 6C-6H. Each layer can be associated with a different set of communication priorities for the nodes of the directed graph and includes a replication of the directed graph (e.g., the three slices of FIG. 2A and/or the six slices of FIGS. 6C-6H each have the same directed graph configuration). The model can be further defined by assigning data communication attributes to the nodes and arcs of each layer, as discussed above. The attributes can be different between layers for the same node. For example, with reference to FIG. 2A, node #7 is a source node in one layer (slice 202-A) and a sink node in another layer (slice 202-B). At least some of the attributes can be associated with different communication priorities. For example, with reference to FIG. 2A, node #7 has a demand of 4 data units and a shortfall penalty of 20 in slice 202-B but a demand of only 2 and a shortfall penalty of only 10 in slice 202-C, illustrating that node #7 has a lower communication priority in slice 202-C than in slice 202-B. The network can be defined at least in part based on a user input (e.g., via user interface module 106 of system 100) in which a user may define the nodes of the network, the arcs connected those nodes, and/or the attributes of nodes and arcs. The network can be defined at least in part based on information received from a network being modeled. For example, the system 100 could query the network 108 for configuration information, such as how many nodes there are and what the interconnections of the nodes are.

At step 1204, an optimized set of communication flows through the model defined in step 1202 is determined based on a minimization of communication cost. This can include accounting for adversary action in the form of an attacker with an attack budget that can be applied to one or more arcs of the directed graph and can optionally include accounting for defender actions. For example, as discussed above with respect to FIG. 5A, an optimized set of communication flows can be determined using a Defender Attacker Defender optimization algorithm in which a defender defends one or more arcs in a first turn in a way that seeks to minimize the operating cost of the network in view of the possible actions an attacker could take and the costs resulting from those actions, an attacker acts upon one or more arcs in a second turn in a way that seeks to maximize the operating cost of the network, and an operator configures the network (e.g., determines the routing of data through the network) that seeks to minimize the operating cost.

In some examples, method 1200 can include optional step 1206 in which routing of communication through the network is modified based on the optimized set of communication flows determined in step 1204. For example, with reference to system 100 of FIG. 1, the management module 102 may communicate data routing commands to the network 108 (e.g., to one or more data routing controllers within the network) to route data in a particular manner based on the optimized set of communication flows determined by optimization module 104.

Figure 13:
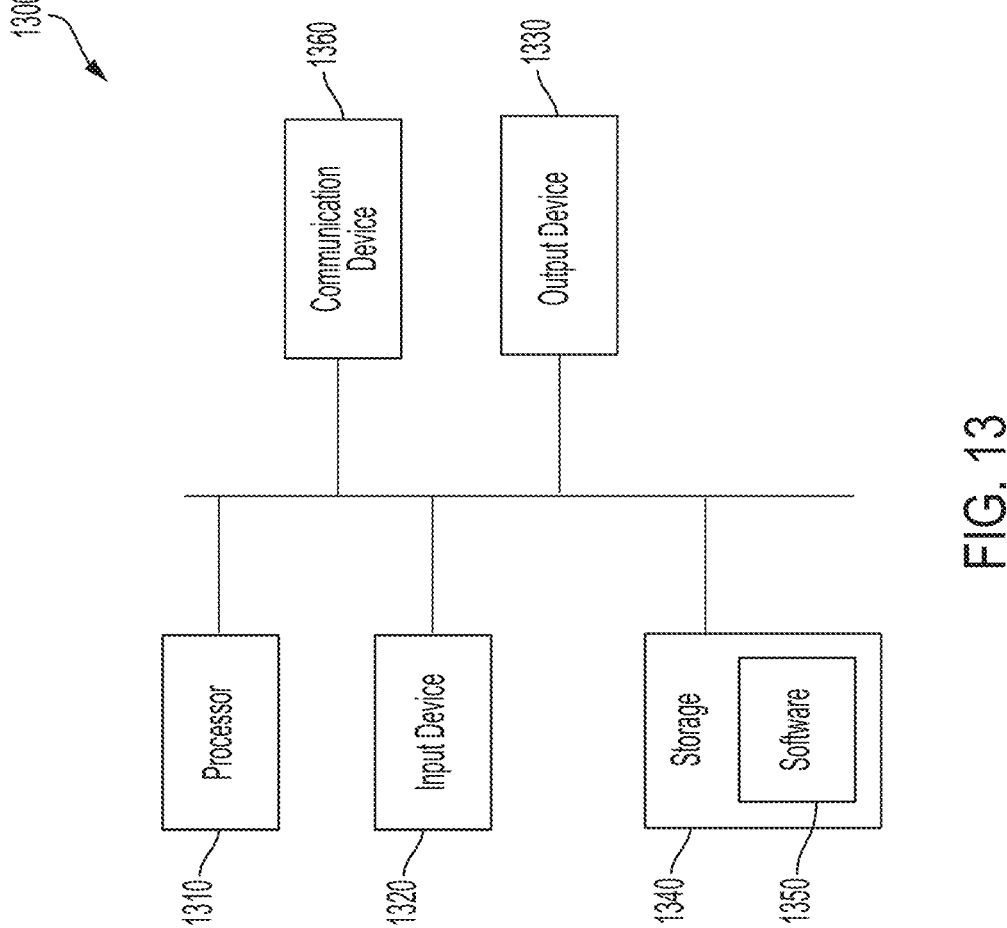
FIG. 13 is an exemplary computing system.

FIG. 13 illustrates an example of a computing system 1300 that can be used for system 100 of FIG. 1. System 1300 can be a computer connected to a network. System 1300 can be a client or a server. System 1300 can be any suitable type of processor-based system, such as a personal computer, workstation, server, handheld computing device (portable electronic device) such as a phone or tablet, or dedicated device. System 1300 can include, for example, one or more of input device 1320, output device 1330, one or more processors 1310, storage 1340, and communication device 1360. Input device 1320 and output device 1330 can generally correspond to those described above and can either be connectable or integrated with the computer.

Input device 1320 can be any suitable device that provides input, such as a touch screen, keyboard or keypad, mouse, gesture recognition component of a virtual/augmented reality system, or voice-recognition device. Output device 1330 can be or include any suitable device that provides output, such as a display, touch screen, haptics device, virtual/augmented reality display, or speaker.

Storage 1340 can be any suitable device that provides storage, such as an electrical, magnetic, or optical memory including a RAM, cache, hard drive, removable storage disk, or other non-transitory computer readable medium. Communication device 1360 can include any suitable device capable of transmitting and receiving signals over a network, such as a network interface chip or device. The components of the computing system 1300 can be connected in any suitable manner, such as via a physical bus or wirelessly.

Processor(s) 1310 can be any suitable processor or combination of processors, including any of, or any combination of, a central processing unit (CPU), field programmable gate array (FPGA), and application-specific integrated circuit (ASIC). Software 1350, which can be stored in storage 1340 and executed by one or more processors 1310, can include, for example, the programming that embodies the functionality or portions of the functionality of the present disclosure (e.g., as embodied in the devices as described above), such as programming for performing one or more steps of method 1200 of FIG. 12.

Software 1350 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1340, that can contain or store programming for use by or in connection with an instruction execution system, apparatus, or device.

Software 1350 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport computer readable medium can include, but is not limited to, an electronic, magnetic, optical, electromagnetic, or infrared wired or wireless propagation medium.

System 1300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1300 can implement any operating system suitable for operating on the network. Software 1350 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method comprising:
defining a model that represents a communication network, wherein defining the model comprises:
formulating a directed graph comprising nodes that represent communication data sources, communication data sinks, and communication data routers of at least a portion of the communication network and arcs connecting nodes that represent communication links between the communication data sources, communication data sinks, and communication data routers,
defining a plurality of layers, each layer associated with a different set of communication priorities and comprising a replication of the directed graph, and
assigning data communication attributes to the nodes and arcs of each layer, at least a portion of the data communication attributes being associated with different communication priorities;
determining an optimized set of communication flows through the model based on a minimization of communication cost;
transmitting the optimized set of communication flows as a set of recommendations to the communication network;
converting, via the communication network, the recommendations to a native format; and
re-routing, via the communication network, communication flows based on the recommendations converted to the native format.

2. The method of claim 1, comprising modifying routing of communication through the network based on the determined optimized set of communication flows through the model.

3. The method of claim 1, wherein the attributes of a node comprise at least one of a supply of and a demand for communication data.

4. The method of claim 1, wherein at least one node is a source and a sink.

5. The method of claim 1, wherein there is no communication flow between the layers.

6. The method of claim 1, wherein the model comprises limits for communication flows through the nodes of the network and the optimized set of communication flows comprises, for each node, a total communication flow across the layers that does not exceed the limit for the respective node.

7. The method of claim 1, wherein the communication cost is a function of a cost penalty associated with a shortfall in meeting a source or supply demand.

8. The method of claim 1, wherein the communication cost is a function of a cost to traverse an arc.

9. The method of claim 1, wherein determining an optimized set of communication flows comprises determining a total number of data units traversing each arc of each layer.

10. The method of claim 1, wherein determining the optimized set of communication flows comprises simulating an attack on the network by increasing a cost for traversing and/or a reduction in the capacity of at least one arc.

11. The method of claim 10, wherein determining the optimized set of communication flows comprises simulating a defense of the network by restricting at least one arc from being attacked.

12. The method of claim 1, wherein determining the optimized set of communication flows comprises emulating one or more of an attack or a defense of one or more of the nodes by manipulation of one or more of traversal cost or maximum capacity of one or more the arcs.

13. The method of claim 1, wherein the optimized set of communication flows is further based on a defender-attacker-defender optimization scenario.

14. A computing system comprising one or more processors, memory, and one or more programs stored in the memory for execution by the one or more processors for causing the computing system to perform a method that comprises:

defining a model that represents a communication network, wherein defining the model comprises:

formulating a directed graph comprising nodes that represent communication data sources, communication data sinks, and communication data routers of at least a portion of the communication network and arcs connecting nodes that represent communication links between the communication data sources, communication data sinks, and communication data routers, defining a plurality of layers, each layer associated with a different set of communication priorities and comprising a replication of the directed graph, and assigning data communication attributes to the nodes and arcs of each layer, at least a portion of the data communication attributes being associated with different communication priorities;

determining an optimized set of communication flows through the model based on a minimization of communication cost;

transmitting the optimized set of communication flows as a set of recommendations to the communication network;

converting, via the communication network, the recommendations to a native format; and re-routing, via the communication network, communication flows based on the recommendations converted to the native format.

15. The system of claim 14, comprising modifying routing of communication through the network based on the determined optimized set of communication flows through the model.

16. The system of claim 14, wherein the attributes of a node comprise at least one of a supply of and a demand for communication data.

17. The system of claim 14, wherein at least one node is a source and a sink.

18. The system of claim 14, wherein there is no communication flow between the layers.

19. The system of claim 14, wherein the model comprises limits for communication flows through the nodes of the network and the optimized set of communication flows comprises, for each node, a total communication flow across the layers that does not exceed the limit for the respective node.

20. The system of claim 14, wherein the communication cost is a function of a cost penalty associated with a shortfall in meeting a source or supply demand.

21. The system of claim 14, wherein the communication cost is a function of a cost to traverse an arc.

22. The system of claim 14, wherein determining an optimized set of communication flows comprises determining a total number of data units traversing each arc of each layer.

23. The system of claim 14, wherein determining the optimized set of communication flows comprises simulating an attack on the network by increasing a cost for traversing and/or a reduction in the capacity of at least one arc.

24. The system of claim 23, wherein determining the optimized set of communication flows comprises simulating a defense of the network by restricting at least one arc from being attacked.

25. A non-transitory computer readable medium storing one or more programs for execution by one or more processors of a computing system to cause the computing system to perform a method that comprises:

defining a model that represents a communication network, wherein defining the model comprises:

formulating a directed graph comprising nodes that represent communication data sources, communication data sinks, and communication data routers of at least a portion of the communication network and arcs connecting nodes that represent communication links between the communication data sources, communication data sinks, and communication data routers, defining a plurality of layers, each layer associated with a different set of communication priorities and comprising a replication of the directed graph, and assigning data communication attributes to the nodes and arcs of each layer, at least a portion of the data communication attributes being associated with different communication priorities; and determining an optimized set of communication flows through the model based on a minimization of communication cost;

transmitting the optimized set of communication flows as a set of recommendations to the communication network;

converting, via the communication network, the recommendations to a native format; and re-routing, via the communication network, communication flows based on the recommendations converted to the native format.

26. The system of claim 14, further comprising a management module, wherein the management module is configured to define the model and determine the optimized set of communication flows.

27. The system of claim 26, wherein the computing system is further configured to perform a method that comprises:

in response to the communication network being split into two or more smaller disjoint networks, splitting the management module into corresponding two or more management modules for the two or more smaller disjoint networks.

\* \* \* \* \*